United States Patent
Beale et al.

(10) Patent No.: US 10,798,719 B2
(45) Date of Patent: Oct. 6, 2020

(54) COMMUNICATIONS DEVICE, INFRASTRUCTURE EQUIPMENT, WIRELESS COMMUNICATIONS NETWORK AND METHODS

(71) Applicant: SONY CORPORATION, Tokyo (JP)

(72) Inventors: Martin Warwick Beale, Basingstoke (GB); Shin Horng Wong, Basingstoke (GB); Brian Alexander Martin, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 134 days.

(21) Appl. No.: 16/066,123

(22) PCT Filed: Dec. 28, 2016

(86) PCT No.: PCT/EP2016/082757
§ 371 (c)(1),
(2) Date: Jun. 26, 2018

(87) PCT Pub. No.: WO2017/121618
PCT Pub. Date: Jul. 20, 2017

(65) Prior Publication Data
US 2018/0376484 A1    Dec. 27, 2018

(30) Foreign Application Priority Data

Jan. 12, 2016  (EP) .................................. 16150979

(51) Int. Cl.
*H04W 72/08* (2009.01)
*H04L 5/00* (2006.01)
(Continued)

(52) U.S. Cl.
CPC ........ *H04W 72/085* (2013.01); *H04B 17/309* (2015.01); *H04L 5/0037* (2013.01);
(Continued)

(58) Field of Classification Search
CPC ... H04B 17/309; H04L 5/0037; H04L 5/0053; H04W 24/10; H04W 72/0406;
(Continued)

(56) References Cited

U.S. PATENT DOCUMENTS 8,837,321 B2 * 9/2014 Henttonen ........ H04W 36/0094
370/252
10,117,244 B2 * 10/2018 Ratasuk ............ H04W 72/0453
(Continued)

FOREIGN PATENT DOCUMENTS

WO    WO 2010/053984 A2    5/2010

OTHER PUBLICATIONS

International Search Report dated Jul. 20, 2017, in PCT/EP2016/082757 filed Dec. 28, 2016.
(Continued)

*Primary Examiner* — Chi H Pham
*Assistant Examiner* — Weibin Huang
(74) *Attorney, Agent, or Firm* — Xsensus LLP

(57) ABSTRACT

A communications device configured to transmit/receive signals to/from an infrastructure equipment of a mobile communications network includes a receiver, a transmitter, and a controller. The communications device is configured to: receive from a mobile communications network an indication listing narrowband carriers provided by one or more infrastructure equipment forming one or more cells of the mobile communications network, and an indication of type of the narrowband carriers; to measure a strength of signals received from each of the narrowband carriers, to select one of the narrowband carriers based on the type and a value of the measured strength of the signals received from the narrowband carriers, and to transmit signals to the infrastructure equipment providing the selected narrowband carrier to inform the mobile communications network that (Continued)

Example process of selecting or reselecting a narrowband carrier depending on the type and the measured received signal strength from the narrowband carrier the communications device can receive data from the mobile communications network via the selected narrowband carrier to reduce an uplink transmission power.

15 Claims, 12 Drawing Sheets

(51) Int. Cl.
| | |
|---|---|
| *H04W 72/04* | (2009.01) |
| *H04B 17/309* | (2015.01) |
| *H04W 24/10* | (2009.01) |
| *H04W 72/10* | (2009.01) |

(52) U.S. Cl.
CPC ........... *H04L 5/0053* (2013.01); *H04W 24/10* (2013.01); *H04W 72/0406* (2013.01); *H04W 72/0453* (2013.01); *H04W 72/0473* (2013.01); *H04W 72/10* (2013.01)

(58) Field of Classification Search
CPC ......... H04W 72/0453; H04W 72/0473; H04W 72/10; H04W 72/085
See application file for complete search history.

(56) References Cited

U.S. PATENT DOCUMENTS

| | | | | |
|---|---|---|---|---|
| 10,389,457 | B2* | 8/2019 | Annam | ................ H04W 48/16 |
| 2009/0011795 | A1* | 1/2009 | Fukui | ................... H04J 11/0093 |
| | | | | 455/561 |
| 2009/0274224 | A1* | 11/2009 | Harris | ................ H04L 27/2601 |
| | | | | 375/260 |
| 2010/0322094 | A1* | 12/2010 | Allpress | ................ H04W 72/02 |
| | | | | 370/252 |
| 2014/0357268 | A1* | 12/2014 | Dubey | ................... H04W 48/16 |
| | | | | 455/434 |
| 2016/0127918 | A1* | 5/2016 | Yi | ......................... H04W 16/26 |
| | | | | 370/329 |
| 2018/0242179 | A1* | 8/2018 | Rathonyi | ............ H04W 72/048 |
| 2018/0376484 | A1* | 12/2018 | Beale | ..................... H04L 5/0053 |
| 2019/0021081 | A1* | 1/2019 | Ljung | ................... H04L 5/0044 |

OTHER PUBLICATIONS

3GPP TSG RAN WG1 Meeting #83, R1-156923, "Multiple NB-IoT carrier deployment", Agenda Item: 6.2.6.2, Nov. 2015, 4 pages, XP051039951.

3GPP TSG-RAN WG2 #92, R2-156762. "Idle Mode Mobility", Agenda Item: 7.16.2.3. Nov. 2015. 4 pages, XP051006080.

3GPP TSG RAN WG1 Meeting #83, R1-156529, "On Layer 1 design and procedures for NB-IoT downlink", Agenda Item: 6.2.6.2.2, Nov. 2015, 6 pages, XP 51002959.

Holma, H. et al., "LTE for UMTS: OFDMA and SC-FDMA Based Radio Access", Wiley 2009, ISBN 978-0-470-99401-6.

3GPP TSF RAN Meeting #68, RP-151109, "New SI proposal: Feasibility Study on LTE-based V2X Services", Agenda Item: 13.1.1, Jun. 2015, 7 pages.

3GPP TS 25.331, V13.0.0, "3rd Generation Partnership Project Technical Specification Group Radio Access Network; Radio Resource Control (RRC); Protocol specification" (Release 13), Sep. 2015, 2228 pages (with 6 cover sheets).

3GPP TSG RAN WG2 #92, R2-156172. "NB-IOT—Measurements in connected mode", Agenda Item: 7.16.2.1, Nov. 2015, 3 pages.

3GPP TSG-RAN WG2 #92, Tdoc R2-156394. "RRC Connection Control for NB-IoT", Agenda Item: 07.16.2.1, Nov. 2015, 4 pages.

* cited by examiner

Conventional UE idle mode cell (re)-selection process

LTE home cells and neighbour cells

Example process of selecting or reselecting a narrowband carrier depending on the type and the measured received signal strength from the narrowband carrier Flow chart of cell reselection process for when measurements are made on anchor carriers; and secondary carriers are listed in system information of the neighbour cell Flow chart of cell reselection process for when measurements are made on anchor carriers; and secondary carriers are listed in neighbour cell list of the home cell

COMMUNICATIONS DEVICE, INFRASTRUCTURE EQUIPMENT, WIRELESS COMMUNICATIONS NETWORK AND METHODS

BACKGROUND

The present application claims the Paris convention priority of European patent application 16150979.9 the contents of which are incorporated herein by reference.

Field of Disclosure

The present disclosure relates to communications devices, which are configured to transmit uplink signals to and/or receive downlink signals from an infrastructure equipment of a mobile communications network via a wireless access interface which is configured to include on the uplink a plurality of different subcarrier spacings. The present technique also relates to infrastructure equipment and methods of communicating.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation wireless communications systems, such as those based on the third generation project partnership (3GPP) defined UMTS and Long Term Evolution (LTE) architecture are able to support sophisticated services such as instant messaging, video calls as well as high speed internet access. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will need to support communications to and from a much wider range of devices, including reduced complexity devices, machine type communication devices, devices which require little or no mobility, high resolution video displays and virtual reality headsets. As such, supporting such a wide range of communications devices can represent a technical challenge for a wireless communications network.

A current technical area of interest to those working in the field of wireless and mobile communications is known as "The Internet of Things" or IoT for short. The 3GPP has proposed to develop technologies for supporting narrow band (NB)-IoT using an LTE or 4G wireless access interface and wireless infrastructure. Such IoT devices are expected to be low complexity and inexpensive devices requiring infrequent communication of relatively low bandwidth data. It is also expected that there will be an extremely large number of IoT devices which would need to be supported in a cell of the wireless communications network. Furthermore such NB-IoT devices are likely to be deployed indoors and/or in remote locations making radio communications challenging.

SUMMARY OF THE DISCLOSURE

According to one example embodiment of the present technique, a communications device is configured to transmit signals to and/or receive signals from an infrastructure equipment of a mobile communications network. The communications device comprises a receiver, a transmitter and a controller. The receiver is configured to receive signals transmitted by the infrastructure equipment, the transmitter is configured to transmit signals to the infrastructure equipment, and the controller is configured to control the transmitter and the receiver to receive data from the infrastructure equipment. The wireless access interface is provided by the mobile communications network within a system bandwidth, and the transmitter and the receiver are configured to transmit and receive signals within a bandwidth which is narrower than the system bandwidth using predetermined narrowband carriers of different types. The communications device is configured to receive from the mobile communications network an indication listing narrowband carriers provided by one or more infrastructure equipment forming one or more cells of the mobile communications network, and an indication of the type of the narrowband carriers. The communications device is configured to measure a strength of signals received from each of the narrowband carriers, to select one of the narrowband carriers from the list of the narrowband carriers based on the type of the narrowband carrier and a value of the measured strength of the signals received from the narrowband carriers, and to transmit signals to the infrastructure equipment providing the selected narrowband carrier to inform the mobile communications network that the communications device can receive data from the mobile communications network via the selected narrowband carrier.

Embodiments of the present technique can provide an arrangement of a communications device and a mobile communications network in which the communications device, which is adapted for transmitting and receiving signals to and from narrowband carriers, is provided with an indication of a type of each of the narrowband carriers which are available for selection. The communications device may be suitable to support IoT type communications, because the narrowband carriers are better suited and more efficient for such IoT devices, which may be of low complexity and cost and therefore are provided with a narrowband transmitter and receiver. The narrowband carriers are deployed by the mobile communications network from one or more infrastructure equipment and may be of different types. For example the types of narrowband carriers could be in-band being formed within a system bandwidth of the mobile communications network, standalone which is formed outside the system bandwidth or guardband which is formed in a guard frequency band of a wireless access interface of the mobile communications network. By receiving an indication of a type of the narrowband carrier, the communications device can bias a selection or reselection to a preferred narrowband carrier type depending on a strength of signals received from the narrowband carriers, so that an uplink transmission power can be reduced.

According to another example of the present technique, the communications device is configured to receive from the mobile communications network an indication for identifying one or more of narrowband carriers, listed by the mobile communications network, for which the communications device should report the measured received signal strength to the mobile communications network, to receive a threshold of a measured received signal strength value for reporting the measured received signal strength value, and to transmit an indication of the measured received signal strength exceeding the threshold for a predetermined number of the best measured received signal strength values of the one or more narrowband carriers identified for reporting to the mobile communications network.

Embodiments of the present technique can also provide an arrangement in which a mobile communications network can redirect the communications device to one of the other narrowband carriers other than the narrowband carrier selected by the communications device to provide load balancing.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein:

FIG. 4 is a schematic illustration and part block diagram showing an arrangement in which a UE determines in an idle mode which of the neighbouring cells the UE should select to receive downlink communications and to camp on to;

DETAILED DESCRIPTION OF THE EMBODIMENTS

Conventional Communications System

Figure 1:
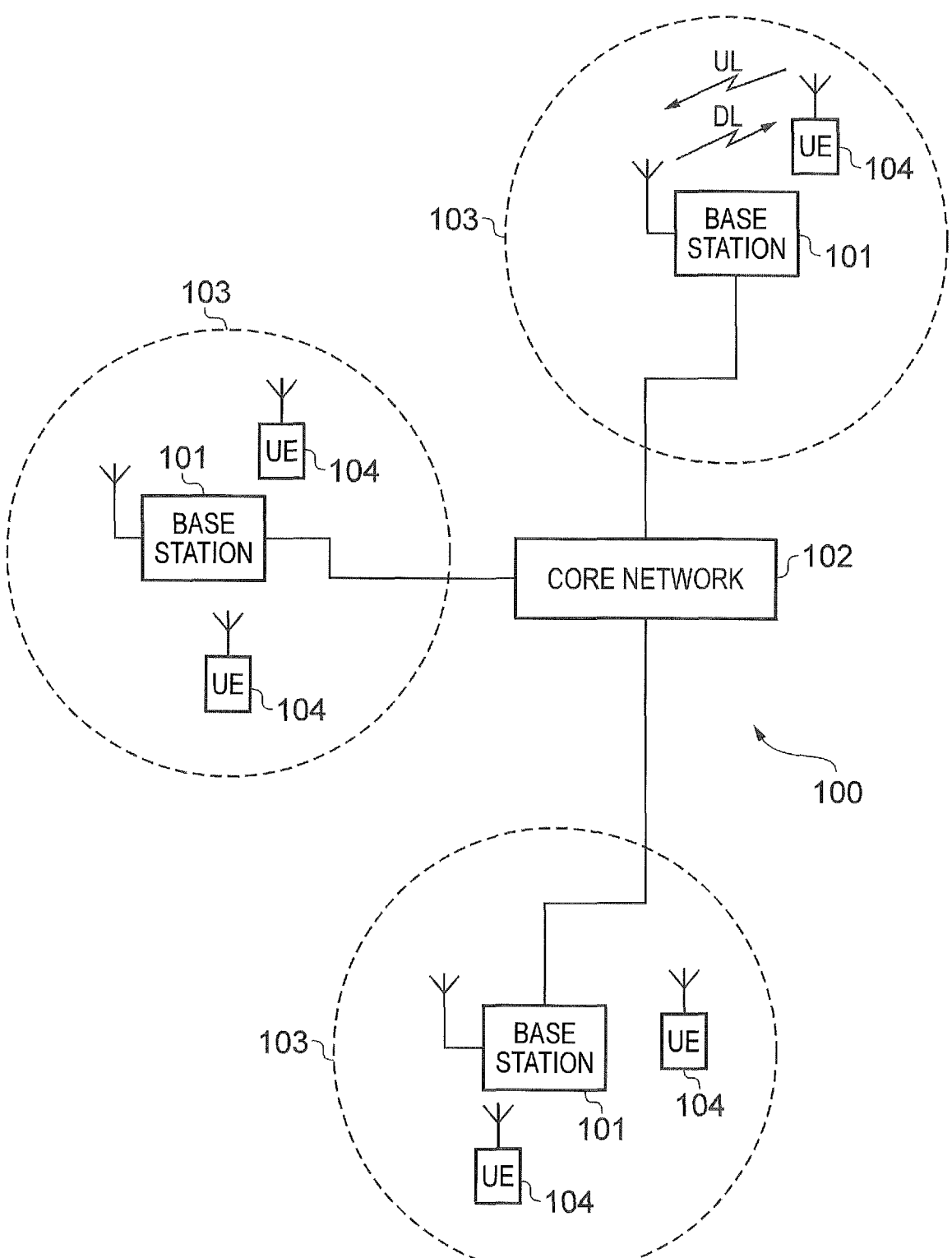
FIG. 1 is a schematic block diagram illustrating an example of a mobile telecommunication system.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP (®) body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink. Data is transmitted from communications devices 104 to the base stations 101 via a radio uplink. The uplink and downlink communications are made using radio resources that are licensed for exclusive use by the operator of the network 100. The core network 102 routes data to and from the communications devices 104 via the respective base stations 101 and provides functions such as authentication, mobility management, charging and so on. Communications devices may also be referred to as mobile stations, user equipment (UE), user device, mobile radio, and so forth. Base stations may also be referred to as transceiver stations/NodeBs/eNodeBs (eNB for short), and so forth.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

Figure 2:
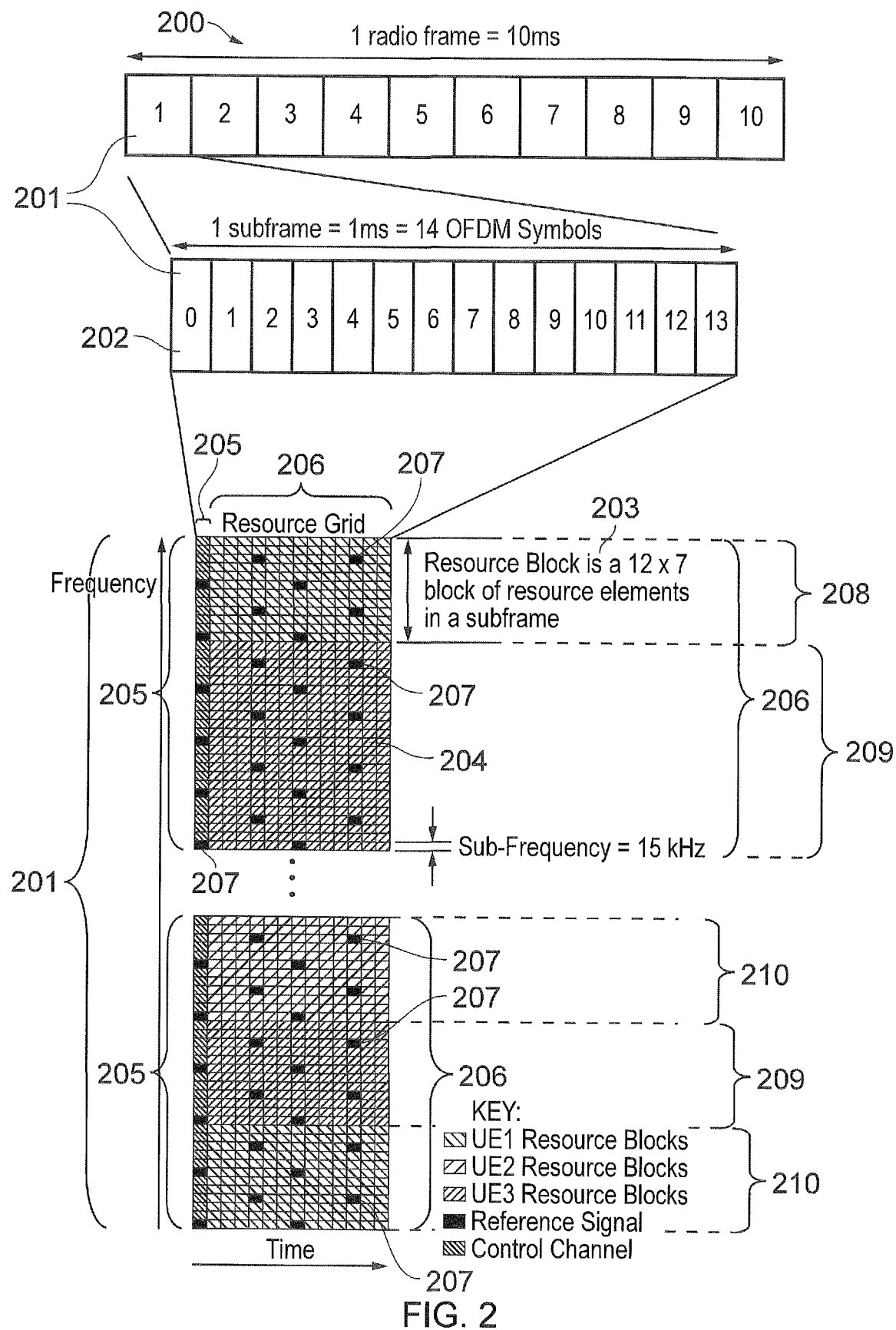
FIG. 2 is a schematic representation illustrating a frame structure of a down-link of a wireless access interface according to an LTE standard.

FIG. 2 provides a simplified schematic diagram of the structure of a downlink of a wireless access interface that may be provided by or in association with the eNB of FIG. 1 when the communications system is operating in accordance with the LTE standard. In LTE systems the wireless access interface of the downlink from an eNB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.25 MHZ and 20 MHz bandwidth may be divided into 128 to 2048 orthogonal subcarriers for example. Each subcarrier bandwidth may take any value but in LTE it is conventionally fixed at 15 KHz. However it has been proposed in the future [2][3] to provide also a reduced subcarrier spacing of 3.75 kHz for certain parts of the LTE wireless access interface for both the uplink and the downlink. As shown in FIG. 2, the resources of the wireless access interface are also temporally divided into frames where a frame 200 lasts 10 ms and is subdivided into 10 subframes 201 each with a duration of 1 ms. Each subframe is formed from 14 OFDM symbols and is divided into two slots each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. More details of the down-link structure of the LTE wireless access interface are provided in Annex 1.

Figure 3:
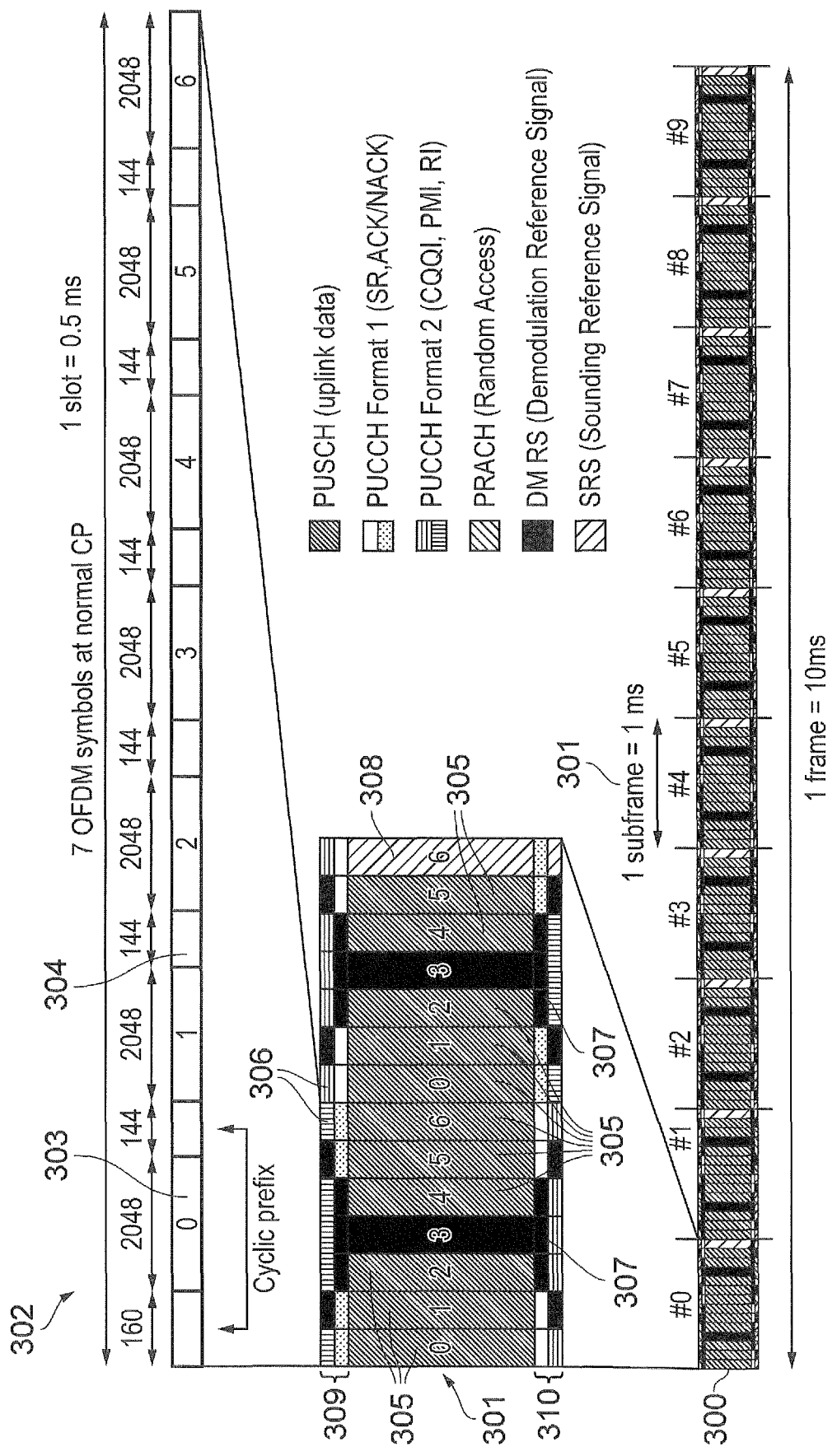
FIG. 3 is a schematic representation illustrating a frame structure of an up-link of wireless access interface according to an LTE standard.

FIG. 3 provides a simplified schematic diagram of the structure of an uplink of an LTE wireless access interface that may be provided by or in association with the eNB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. In FIG. 3 a normal cyclic prefix is used and therefore there are seven OFDM symbols within a subframe, however, if an extended cyclic prefix were to be used, each slot would contain only six OFDM symbols. The resources of the uplink subframes are also divided into resource blocks and resource elements in a similar manner to downlink subframes. More details of the LTE up-link represented in FIG. 3 are provided in Annex 1.

Narrowband Internet of Things

As explained above, it has been proposed to develop an adaptation of a mobile communications network to accommodate narrow band communications within an existing wireless access interface which has been developed to provide broadband wireless communications. A standalone version of the narrow band communications is also supported, whereby the narrowband communications do not occupy resources within an existing wireless carrier. For example, in 3GPP a project relating to improvements to LTE wireless access interfaces to provide for a Narrowband Internet of Things (NB-IoT) was agreed [2]. This project is aimed at improved indoor coverage, support for massive number of low throughput devices, low delay sensitivity, ultra-low device cost, low device power consumption and (optimised) network architecture. An example of such a device is a smart meter. It has been proposed that an NB-IoT communications system supports a bandwidth of only 180 kHz and can have three operational modes: which are standalone, in-band and guardband. These are explained as follows:

For standalone operation a single NB-IoT carrier is provided. The bandwidth of the carrier is approximately 200 kHz and the down-link transmit power in the carrier can be of the order of 43 dBm. The downlink power spectral density of this standalone NB-IoT carrier is high.

An in-band operating mode of the NB-IoT carrier uses one physical resource block (PRB) of a host LTE carrier. The NB-IoT carrier can be power boosted relative to the power of the PRBs used for legacy UEs. If the transmit power of the base station is 43 dBm and the bandwidth of the LTE signal is 10 MHz (50 PRB), the transmit power of the NB-IoT carrier is 43—10 $\log_{10}(50)$=26 dBm. The NB-IoT carrier could be power boosted (by up to 6 dB) relative to the rest of the PRBs of the LTE carrier. There can be multiple NB-IoT carriers supported inside the bandwidth of the LTE carrier. When there are multiple NB-IoT carriers in the system bandwidth, one of the carriers may be considered as an anchor carrier and the other carriers are considered as secondary carriers. The anchor carrier may be down-link power boosted and contains synchronisation (NB-PSS and NB-SSS) and system information signals (NB-MIB and NB-SIB). Secondary carriers are typically not power boosted and do not necessarily contain synchronisation signals and system information.

A guardband operating mode can provide an NB-IoT carrier, which is adjacent to the LTE carrier, but not within the bandwidth of the LTE carrier. From the eNodeB perspective, a guardband NB-IoT carrier can either have a separate power amplifier (PA) to the LTE carrier, or can share the same PA as the LTE carrier. It might use the same IFFT (inverse fast Fourier transform) as the LTE carrier, or may use a separate IFFT. Using the same IFFT would increase orthogonality between the NB-IoT carrier and the LTE carrier. The guardband NB-IoT carrier does not need to be located on the same subcarrier spacing as the LTE carrier (although this might be a sensible practical design). In reality, the transmit power of a guardband NB-IoT carrier may be limited either through issues of sharing the same PA as the host LTE carrier, or from consideration of interference caused to neighbouring carriers adjacent to the guardband.

Standalone/Inband Cell (Re)selection

Embodiments of the present technique can provide a communications device, which is configured for narrowband communications, such as may be suitable for example to support NB-IoT type communications. The communications device is configured to transmit signals to and/or receive signals from an infrastructure equipment of a mobile communications network via a wireless access interface. The wireless access interface is provided by the mobile communications network within a system bandwidth, and the communications device may be configured to transmit and receive signals within a bandwidth which is narrower than the system bandwidth using predetermined narrowband carriers of different types. The communication device may alternatively transmit and receive signals within the bandwidth of a narrowband standalone carrier. The communications device is configured to receive from the mobile communications network an indication listing narrowband carriers provided by one or more infrastructure equipment forming one or more cells of the mobile communications network, and an indication of the type of the narrowband carriers. The communications device is configured to generate a received signal metric representing a measured strength or quality of signals received from each of the narrowband carriers, to select one of the narrowband carriers from the list of the narrowband carriers based on the type of the narrowband carrier and a value of the received signal metric from the narrowband carriers, for attaching to the mobile communications network.

Embodiments of the present technique can provide an arrangement of a communications device and a mobile communications network in which the communications device can receive an indication of a type of the narrowband carrier, so that the communications device can bias a selection or reselection to a preferred narrowband carrier type depending on a received signal metric determined for a strength or quality of signals received from the narrowband carriers, so that an uplink transmission power can be reduced.

The received signal metric maybe for example be a received signal strength or quality such as a Reference Signal Received Power (RSRP) or Received Signal Strength Indicator (RSSI) or a Reference Signal Received Quality (RSRQ), which are measurements used in LTE. The RSSI is a measure of the total received power observed only in OFDM symbols containing reference symbols for an antenna port in the measurement bandwidth over N reference Blocks. RSRP is defined as the linear average over the power contributions of the resource elements which carry cell-specific reference signals. RSRQ is defined as the ratio N x RSRP/(E-UTRA carrier RSSI), wherein N is the number of resource blocks of the E-UTRA carrier RSSI measurement bandwidth. One or more of these example measurements is measured to generate a value to which an offset value can be applied.

Figure 4:
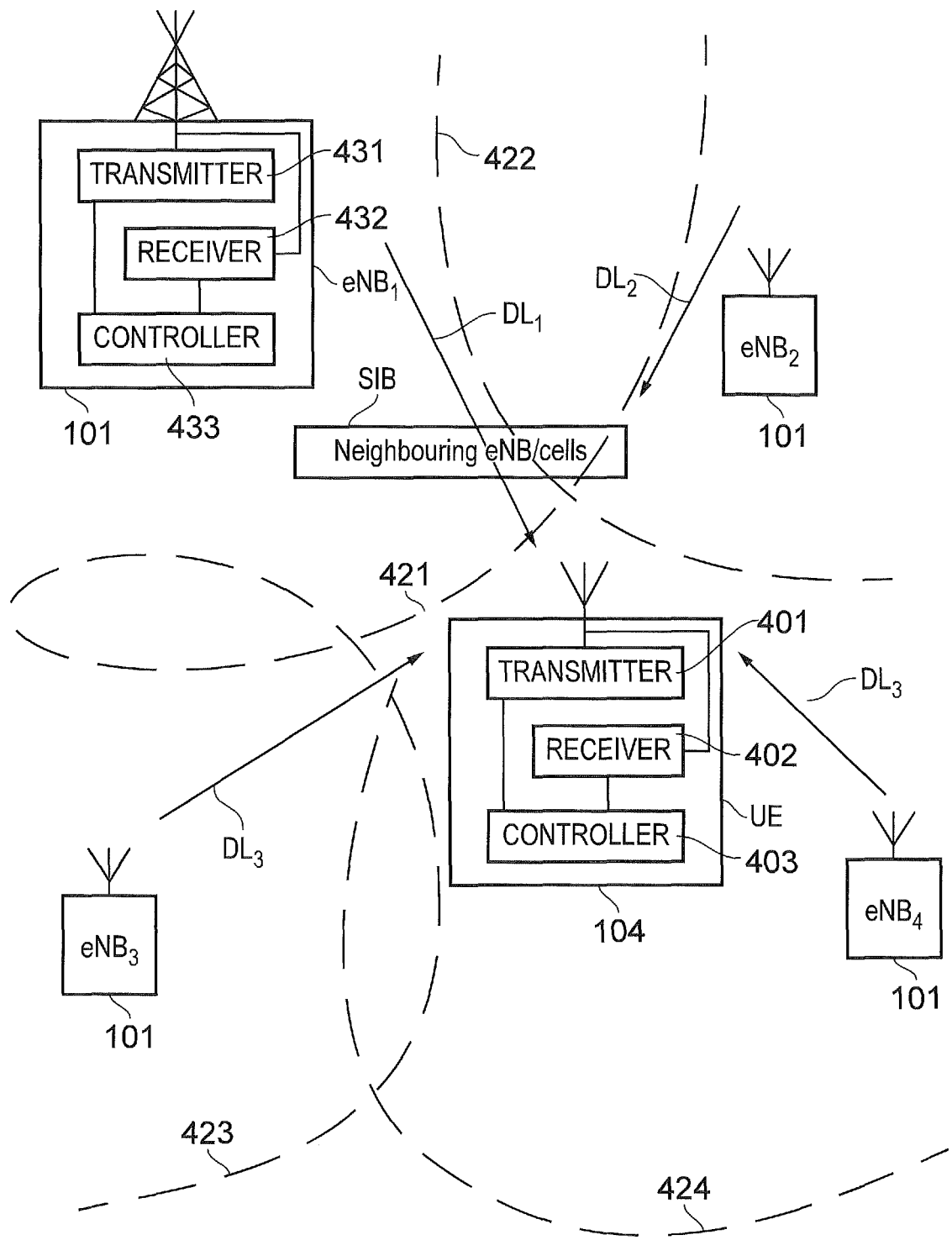

FIG. 4 provides a schematic block diagram of an arrangement in which a UE performs an idle mode selection process in which it selects or reselects a cell created by an eNB for receiving downlink communications. That is to say, the UE attaches or camps on to a cell which is selected or reselected by the UE. As shown in FIG. 4, a UE 104 includes a transmitter 401, a receiver 402 and a controller 403. The transmitter 401, receiver 402 and controller 403 are arranged to transmit and receive signals via a wireless access interface provided by the mobile communications network. As shown in FIG. 1, the wireless communications network includes a plurality of infrastructure equipment including eNBs 101 and parts forming the core network. As shown in FIG. 4, four eNB's eNB1, eNB2, eNB3, eNB4 are shown to form four cells which are respectively represented by dashed lines 421, 422, 423 and 424. One of the eNB's, eNB1 is shown in more detail to include a transmitter 431, a receiver 432 and a controller 433. During idle mode the UE 104 performs a cell selection or reselection process to determine which of the eNB's, eNB1, eNB2, eNB3, eNB4 the UE should attach or camp on to.

In accordance with a conventional arrangement the UE first receives from one of the eNB's eNB1, an indication indicating to a UE a list of neighbouring eNB's or cells to which the UE could attach. This list may have been received by the UE when it previously camped onto one of the cells formed by eNodeBs eNB1, eNB2, eNB3 or eNB4. Alternatively the UE could receive information from each of the eNB's which have sufficient downlink signal strength for the UE to receive downlink signals and form a list of neighbouring eNB's or cells itself. The list of neighbouring cells provides an indication to the UE of the carrier signals and their location within the frequency band provided by each of the available eNB's.

Using the list, the UE 104 then receives downlink signals represented by arrows DL1, DL2, DL3, DL4 from each of the eNB's ENB1, ENB2, ENB3, ENB4 and determines a strength of the signals received from each of the carrier signals on the downlink. The UE then selects the eNB which has the greatest signal strength or one of the eNBs with a signal strength that is greater than a threshold.

The operation of the UE in selecting a cell or carrier to which the UE should attach is represented by the flow diagram shown in FIG. 5 which is summarized as follows:

S1: A UE receives from one of the eNB's of the wireless communications network an indication of each of the eNB's within its location which can form neighbouring cells to the current cell in the form of a list of neighbouring cells.

S2: The UE then measures a received signal strength of signals received from each of the carrier signals provided from the neighbouring cells. These are necessarily downlink signals transmitted at a predetermined signal power.

S4: The UE then compares the signal strength of each of the carriers that it receives from each of the neighbouring cells on the list of neighbouring cells.

S6: The eNB which provides a carrier signal strength with the largest amplitude is then selected by the UE as the cell on which it should attach or camp on to.

S8: The UE then transmits signals to the selected eNB on the measured carrier which informs the network of the eNB that has been selected. Conventionally therefore the mobile communications network will store the location of the UE in the MME so that if downlink data is to be sent to the UE then the network first interrogates the MME to identify which of the eNB's or which of the tracking areas to which the eNB belongs should be used to page the UE in accordance with a known arrangement.

Figure 6:
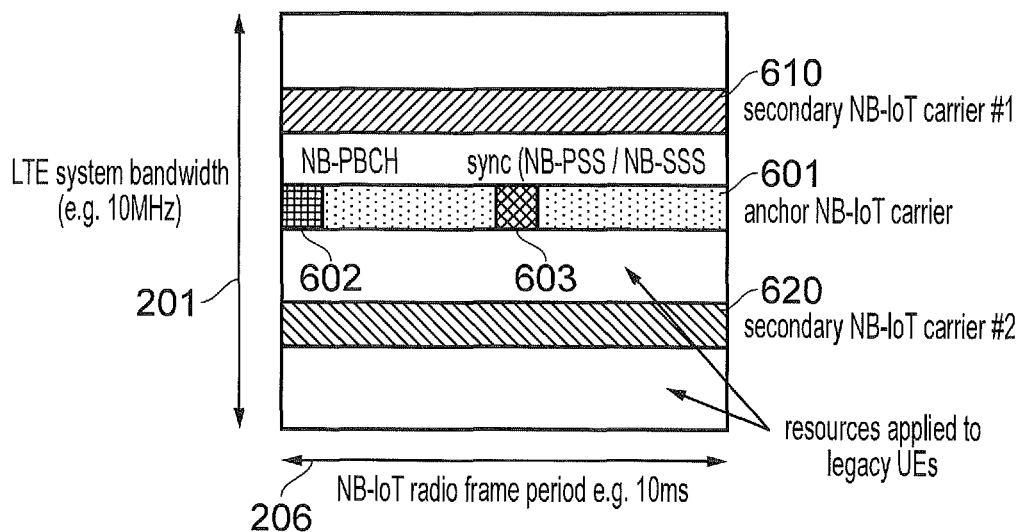
FIG. 6 is a schematic representation of narrowband carriers which are available within a system bandwidth of a wireless communications network according to the LTE standard.

FIG. 6 shows an example of a downlink LTE host carrier, corresponding to the example shown in FIG. 2 supporting three in-band narrowband carriers. FIG. 6 provides a representation of one of the sub frames 206 shown in FIG. 2 in which the resources provided by the resource elements within the sub frame 206 are partitioned to provide different types of narrow band carrier. As shown in FIG. 6, a first narrow band carrier 601 is provided which is an anchor narrow band carrier. This is because the anchor narrow band carrier 601 includes a narrow band NB-PBCH 602 as well as synchronisation signals referred to as narrow band NB-PSS and narrowband NB-SSS 603 which are signals with similar function to those provided by the host carrier for conventional UE's. Furthermore, within the system band width there is also provided a first and a second secondary narrow band carrier 610, 620. The secondary narrow band carriers 610, 620 provide communications resources for a narrow band UE to receive unicast data on the downlink whereas the anchor carrier includes control channel signals 602, 603 for the UE to synchronize and receive cell related information such as the system information block.

Figure 7:
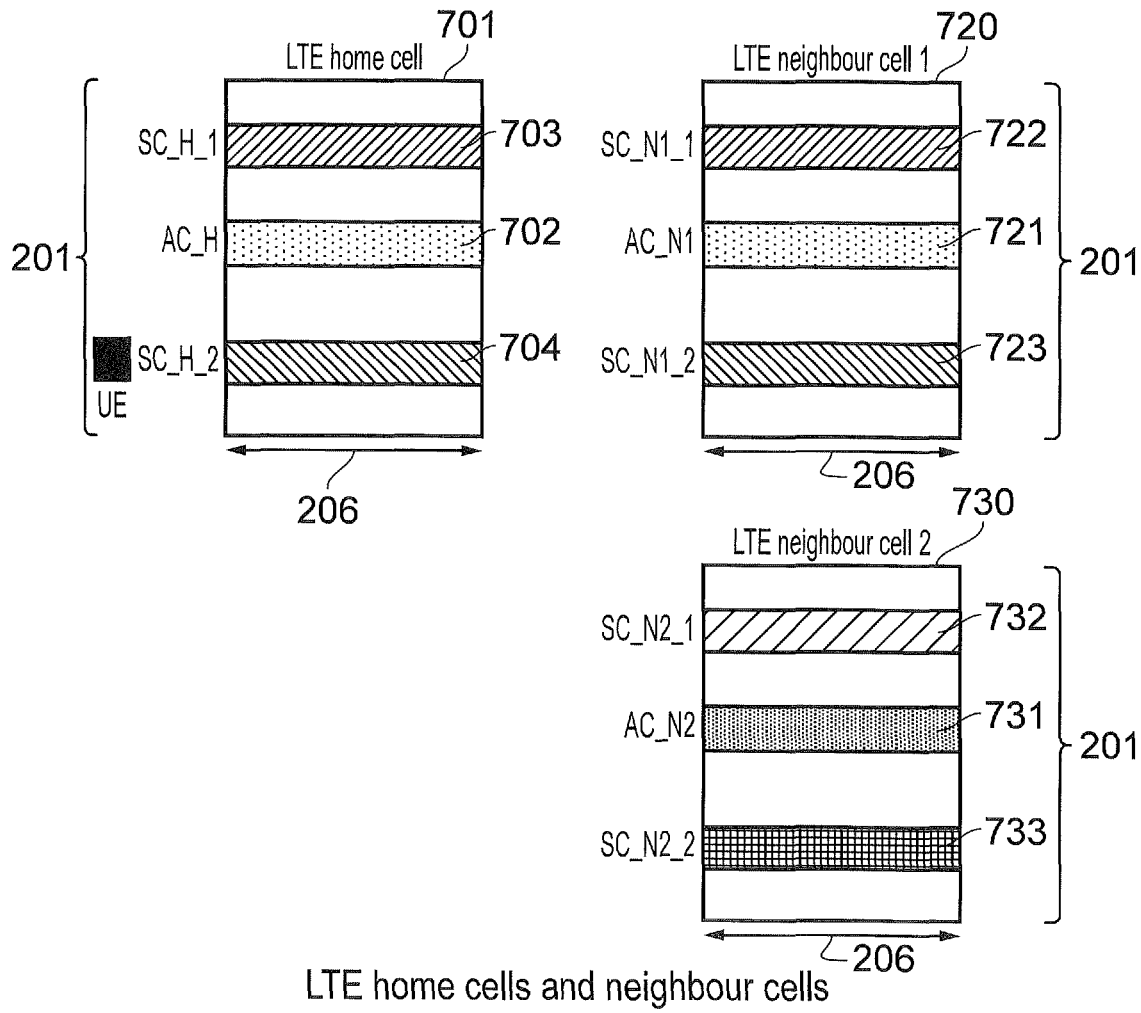
FIG. 7 is a schematic representation of sub-frames within a system bandwidth in which narrowband carriers of different types are provided which can be selected by a UE.

As will be appreciated because there are different types of narrowband carrier, neighbouring cells to a cell on which the UE is currently attached or cells in the vicinity of the UE may provide narrowband carriers of different types. This for example is illustrated in FIG. 7.

The following aspects are noted from FIG. 6:

An anchor (or primary) NB-IoT carrier is located in the host carrier bandwidth. The anchor carrier contains NB-IoT specific NB-PBCH (for transmission of the master information block, MIB) and synchronisation signals (NB-PSS and NB-SSS: primary and secondary synchronisation signals respectively). The anchor NB-IoT carrier is power boosted relative to the legacy LTE carrier, for example the power of the resource elements (subcarriers and OFDM symbols) that comprise the anchor NB-IoT carrier are 6 dB greater than the power of the resource elements within the host LTE carrier.

Two secondary NB-IoT carriers are shown. These secondary NB-IoT carriers do not contain NB-PBCH, do not contain synchronisation signals and are not power boosted relative to the host LTE carrier.

Resources not occupied by LTE carriers can be applied to legacy UEs (e.g. smartphones and other non-NB-IoT devices).

As will be appreciated, some communications devices have been adapted to communicate through an NB-IoT network. As such some NB-IoT devices can be configured to support cell reselection. However such devices may not need to support full handover. When supporting cell reselection, the UEs need to perform measurements on neighbouring cells. The neighbouring cells can either be on the same frequency (UE performs intra-frequency cell reselection) or on a different frequency (UE performs inter-frequency cell reselection). As far as an NB-IoT UE is concerned, an in-band carrier on a neighbour cell is considered to be an intra-frequency carrier if the in-band carrier on the neighbour cell occupies the same range of subcarrier frequencies as the in-band carrier on the serving cell.

FIG. 7 shows an arrangement of LTE carriers and NB-IoT in-band carriers. As shown in FIG. 7 sub-frames from three cells are illustrated which correspond to the example illustration shown in FIG. 6. In FIG. 7 the first cell forms a home cell, that is a cell formed by an eNB to which the UE is currently attached. As shown in FIG. 7, the home cell 701 includes an anchor carrier 702 and first and second secondary carriers 703, 704. Also shown in FIG. 7 are downlink sub-frames within the system bandwidth 201 provided by two neighbouring eNB's forming two neighbouring cells 720, 730. Each of the neighbouring cells 720, 730 has a narrowband anchor carrier 721, 731 and first and second secondary carriers 722, 723, 732, 733. As shown in FIG. 7 the UE is currently communicating via the second of the secondary carriers, SC-H-2, on the home cell.

From the arrangement shown in FIG. 7 in which the UE 104 must select one of the narrowband carriers provided by either the home cell 701 or the neighbouring cells 720, 730 a technical problem exists in optimizing the selection of the narrowband carrier.

Figure 5:
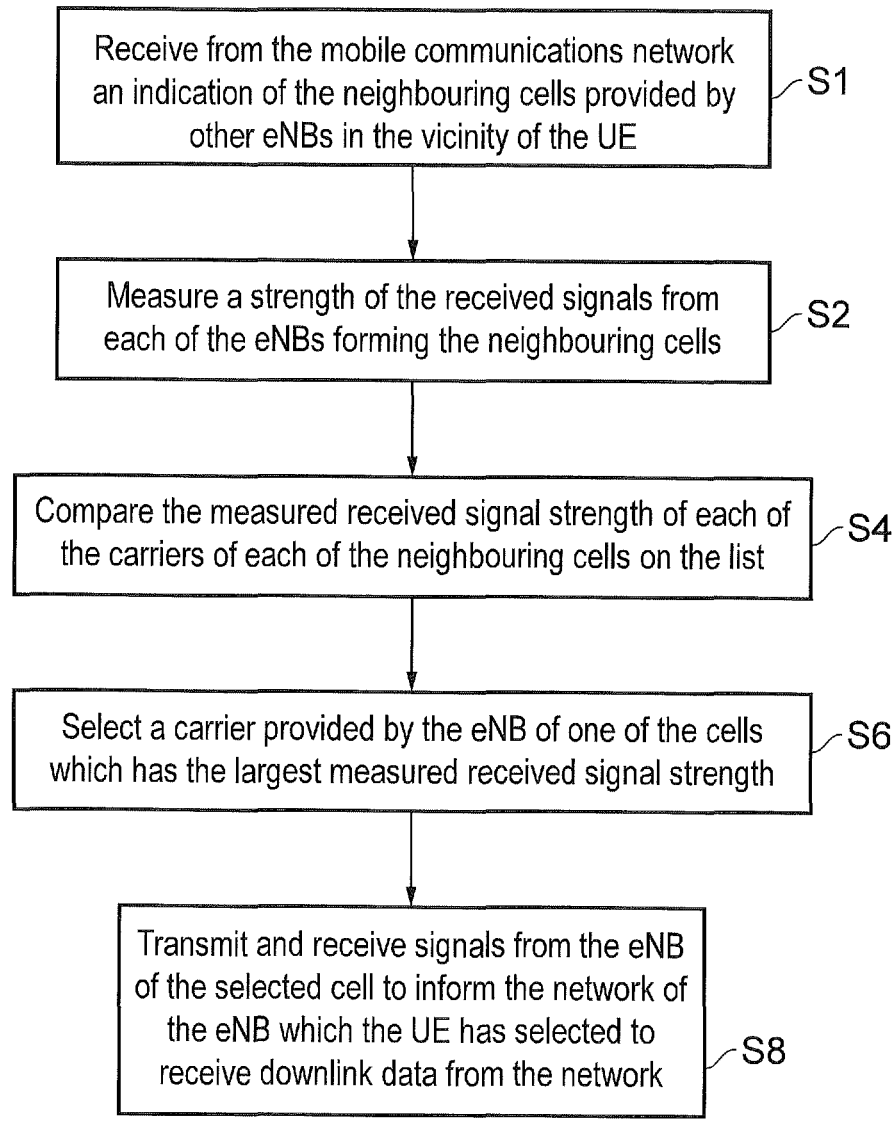
FIG. 5 is a flow diagram illustrating a process in which the UE selects one of the home or neighbouring cells to which it should attach camp on to receive downlink communications.

In the FIG. 5, an LTE home cell is shown ("LTE home cell") and two cells that are neighbour cells ("LTE neighbour cell 1" and "LTE neighbour cell 2") to that cell are shown. The LTE home cell contains an NB-IoT anchor carrier ("AC_H") and two NB-IoT secondary carriers ("SC_H_1" and "SC_H_2"). LTE neighbour cell 1 contains an NB-IoT anchor carrier ("AC_N1") and two NB-IoT secondary carriers ("SC_N1_1" and "SC_N1_2"). LTE neighbour cell 2 contains an NB-IoT anchor carrier ("AC_N2") and two NB-IoT secondary carriers ("SC_N2_1" and "SC_N2_2"). A UE is shown to be connected to the secondary carrier SC_H_2 in the LTE home cell. The neighbour cell list of the LTE home cell contains the following information (for legacy LTE devices, such as smartphones):

Intra-frequency neighbours: LTE neighbour cell 1
Inter-frequency neighbours: LTE neighbour cell 2

The neighbour cell list of the secondary NB-IoT carrier (SC_H_2) to which the UE is connected in the home cell contains the following neighbour cell lists:
intra-frequency neighbours: SC_N1_2
inter-frequency neighbours: SC_H_1, AC_H, SC_N1_1, AC_N1, SC_N2_1, AC_N2, SC_N2_2

As shown in FIG. 7 there may be several in-band carriers in each LTE host carrier. To perform initial cell selection or re-selection, the UE is required to perform measurements on all of these in-band carriers, or at least the subset in the neighbour cell list. These measurements consume UE power and increase the time taken to for cell reselection or initial cell selection. As can be seen from FIG. 7 the number of inter-frequency neighbour cells in the neighbour cell list for the NB-IoT devices can be greater than for the legacy LTE smartphone devices.

The power that the UE receives on the downlink is not necessarily related to the power required to transmit on the uplink. As explained above, a standalone NB-IoT carrier generally has a higher downlink power spectral density than an in-band carrier. However the uplink transmit power is not directly dependent on the down-link receive power. For example, consider a case in which a standalone NB-IoT carrier has a pathloss to the UE of 140 dB and a transmit power of 43 dBm per 200 kHz, and an in-band carrier has a pathloss to the UE of 130 dB and a transmit power of 43 dBm in 10 MHz (i.e. 26 dBm in 200 kHz). For this example the relative received signal strength as determined in accordance with a reference signal received power (RSRP) would be as follows:

The RSRP measurement for the standalone carrier is 43−140=−97 dBm

The RSRP measurement for the in-band carrier is 26−130=−104 dBm

According to these RSRP measurements, the standalone carrier would be the preferable carrier which the UE should select. However when the UE transmits in the uplink, this carrier requires more UE transmit power, because the pathloss for this standalone carrier (140 dB) is greater than for the in-band carrier (130 dB). However if the UE does select the standalone carrier, then the UE, when transmitting on the uplink, will be required to use more power as a result of the additional 10 dB pathloss between the standalone carrier and the in-band carrier.

There is hence a requirement for an improved method of selecting an NB-IoT carrier, during initial cell selection and reselection for mobility purposes, which allows the UE to reduce its uplink transmit power consumption.

Embodiments of the present technique can provide an arrangement in which a UE receives an indication of a type of narrowband carrier which is available from a mobile communications network at the UE's current location. The UE receives an indication of a list of available narrowband carriers from eNB's within its vicinity which may include an indication from an eNB to which the UE has currently formed an attachment and other eNB's which form neighbouring cells which can have narrowband carriers of different types. The UE then proceeds to attach to one of the eNB's depending on predetermined criteria which are typically the strength of signals received from each of the eNB's. The UE then exchanges signalling information with an eNB which has been selected in order to "attach" to that eNB. In this sense attach means that the eNB exchanges signalling messages with that eNB in order to inform the mobile communications network that the UE is currently attached to that eNB in the sense that if downlink communications are to be received by that UE then the network knows that data to be communicated to that UE is sent to the eNB once the UE has attached. In an LTE and in UMTS the mobility management entity MME is responsible for storing a location of the UE in the sense that the MME stores the eNB which the UE has selected to receive downlink communications. The selection of the UE when it is neither transmitting data or receiving data from the mobile communications network can be referred to as an attachment or the UE is said to "camp on" to the eNB.

Accordingly embodiments of the present technique can provide an arrangement in which a list of neighbouring cells includes an indication as to the type of the NB-IoT carrier. That is the neighbouring cell list identifies, for example, whether the neighbouring cells are provided by a NB-IoT carrier which is an in-band, guardband or standalone carrier. The neighbouring cells list may additionally indicate an offset which the UE can assume for the three types of carrier (in-band, guardband and standalone), in order to bias a selection of a carrier which will reduce uplink transmit power consumption.

Figure 8:
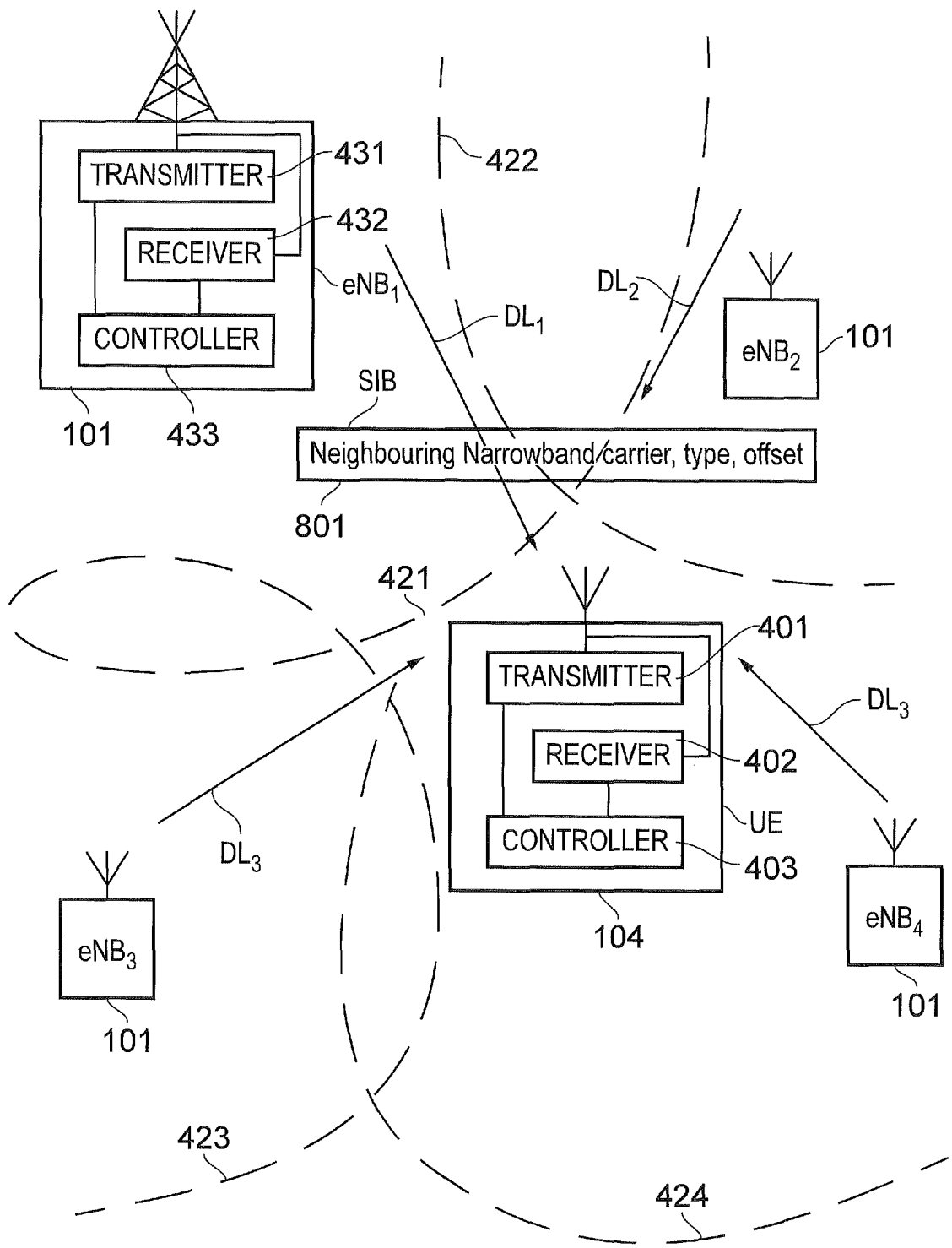
FIG. 8 is a schematic illustration and part block diagram showing an arrangement in which a UE determines in an idle mode which of the neighbouring cells the UE should select to receive downlink communications according to the present technique, which corresponds to the example shown in FIG. 4.

As illustrated in FIG. 8, and in accordance with the present technique, the UE 104 is arranged to receive a list of narrowband carriers which are available within its location and a type of the carrier. FIG. 8 corresponds exactly to FIG. 4 but the system information block 801 shown in FIG. 8 is adapted to include an indication of the narrowband carriers, the type of the narrowband carriers and other information which may be applied by the UE in selecting the most appropriate narrowband carrier. As explained below, in some examples, offset information is included in the system information which is applied by the UE in order to bias a selection of the narrowband carrier to a particular carrier of a particular type.

Figure 9:
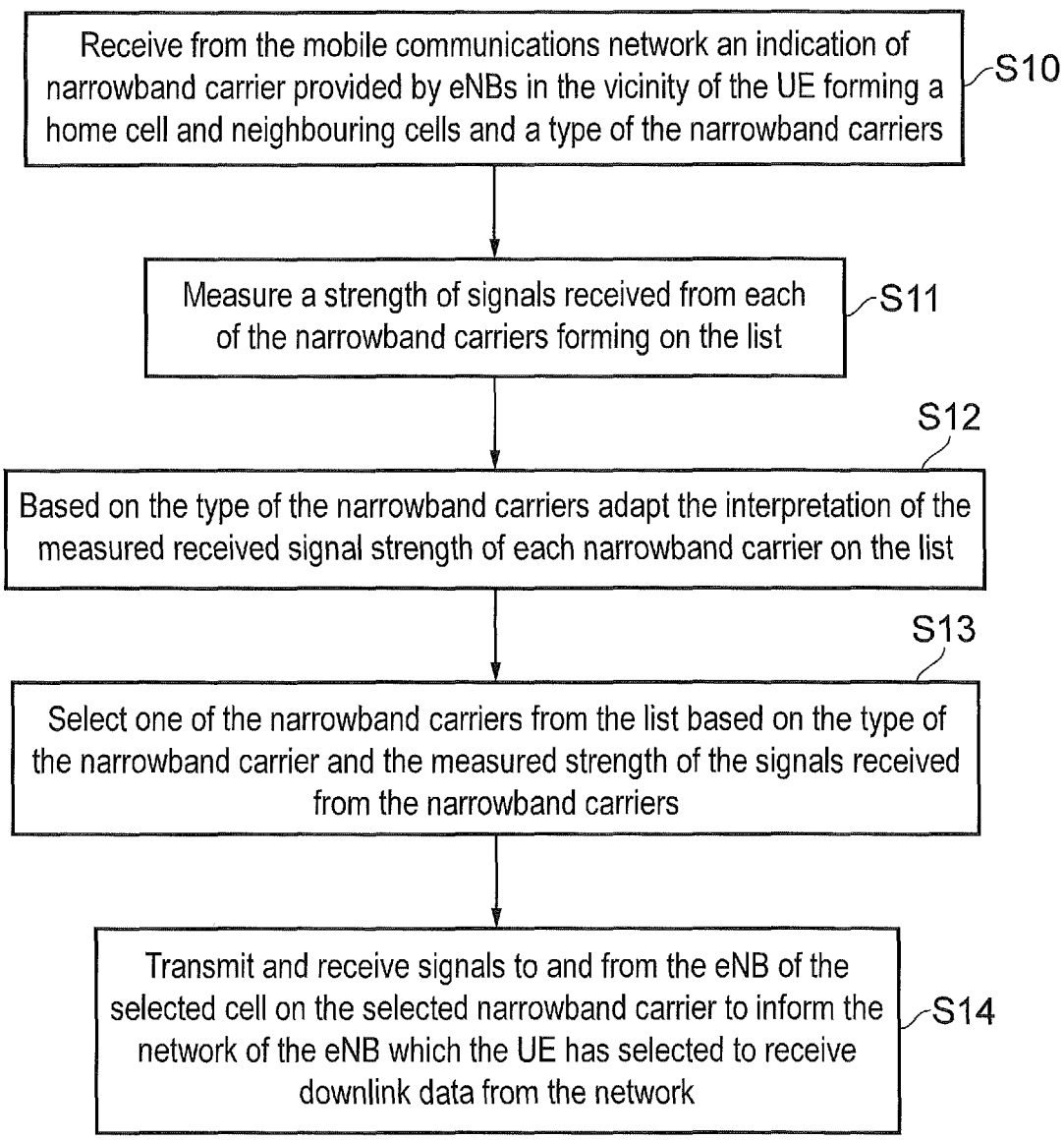
FIG. 9 is a flow diagram representing an example illustration of a process in which a UE selects a narrowband carrier depending on its type.

FIG. 9 provides a flow diagram representing the operation of the UE, which is adapted from that shown in FIG. 5 in order to select the most appropriate narrowband carrier in order to optimize a UE's performance such as reducing an uplink transmission power consumption.

According to some embodiments, offsets for biasing selection to a particular carrier type can be provided as a single offset, for example differentiating between inband and standalone carriers, as opposed to offsets being applied separately for each NB-IoT carrier. With this arrangement, the number of bits signalled in the neighbour cell lists can be reduced.

When the UE measures the down-link signal quality on a neighbour cell carrier, for example by performing an RSRP measurement, the UE adds an offset to the RSRP value to generate a modified RSRP value. The modified value is then an indication of the uplink transmit power, which is required to maintain a connection with that cell. The UE can then select a neighbour NB-IoT carrier on the basis of uplink transmit power requirements.

To acquire the list of neighbouring NB-IoT carriers or cells, according to the present technique, the UE initially configures its receiver to search and to decode system information (MIB and SIB) on the home cell, decoding the system information message containing the neighbour cell list of the home cell, which is broadcast by the eNB in the cell to which the UE is currently attached (home cell). The UE can then configure its receiver to search for and decode signals transmitted by the NB-IoT carriers on the home and neighbour cells using an appropriate configuration. For example, standalone and in-band signals may use a different number of OFDM symbols per subframe, exist on a different channel raster spacing, use a different subcarrier spacing etc. The UE can then attempt to decode these signals based on the appropriate configuration.

The time taken to decode the synchronization signals in NB-IoT depends on the signal level of the received signal. When the received signal power of the NB-IoT carrier is very low, for example in deep coverage enhancement conditions, the time taken to decode the synchronization signal can be very long. Example times required for decoding the synchronization signals are:

standalone NB-IoT carrier: 220 ms
in-band NB-IoT carrier: 900 ms

The UE can consume a significant amount of power decoding these synchronization signals, and the power consumption is directly related to the amount of time required to decode the synchronization signal. However an advantage is provided by embodiments of the present technique because the UE receives a list of neighbouring NB-IoT subcarriers or cell and so the UE knows whether a neighbour cell is a standalone NB-IoT carrier or an in-band carrier. As a result, according to the present technique, the UE can either:

determine synchronization thresholds for the measured carrier
  higher thresholds would be applied to a standalone carrier than to in-band carriers, since the necessary RSRP for a standalone carrier needs to be greater than for an inband carrier (for the uplink link budget to be reasonable)
determine a maximum time to search for synchronization for the measured carrier
  a longer synchronisation time would be applied for in-band carriers, since the received signal strengths for these carriers can be lower than for in-band carriers Embodiments of the present technique, therefore arrange for an eNB to broadcast a single neighbour cell list in which each neighbour cell is tagged with an information element indicating whether it is a standalone carrier or an in-band carrier. The UE may use this information to determine synchronisation thresholds or maximum times to attempt synchronisation, allowing the UE to reduce battery consumption.

In some embodiments, there are separate neighbour cell lists for standalone carrier and in-band carriers.

In another embodiment, the standalone and in-band carriers are located in known locations in the neighbour cell list. A pointer can be additionally signalled to indicate a point in the neighbour cell list at which the standalone carriers are located. For example, if the neighbour cell list consists of thirty two neighbours, a pointer can be set to ten and entries one to ten of the neighbour cell list belong to in-band carriers whereas entries from eleven to thirty two of the neighbour cell list belong to standalone carriers.

In another embodiment of the invention, the neighbour cell lists can also indicate whether the standalone or in-band carriers are small cells, that is cells which are operating with a reduced transmit power. The UE can preferably connect to a small cell since, at the same measured RSRP, the pathloss to a small cell is less than the pathloss to a macrocell.

In some embodiments, anchor carriers may be located on the standard LTE raster spacing. Secondary carriers can be located anywhere within the LTE system bandwidth and their location can be signalled as an offset from the anchor carrier. Hence the neighbour cell list can be signalled with the carrier frequencies of the anchor carriers in neighbour cells and the offsets of secondary carriers within a neighbour host carrier.

In some embodiments, the UE can apply the offset to the measured signal strength value, for example the RSRP value to differentiate between a standalone and in-band carrier as a function of its battery status. If the UE's battery is low, it can add the offset in order to select a cell that minimizes uplink transmit power. If the battery status of the UE is not constrained, the UE can select a cell regardless of the offset, by not adding the offset to the measured received signal power, since uplink transmit power is not so critical to such a UE.

Figure 10:
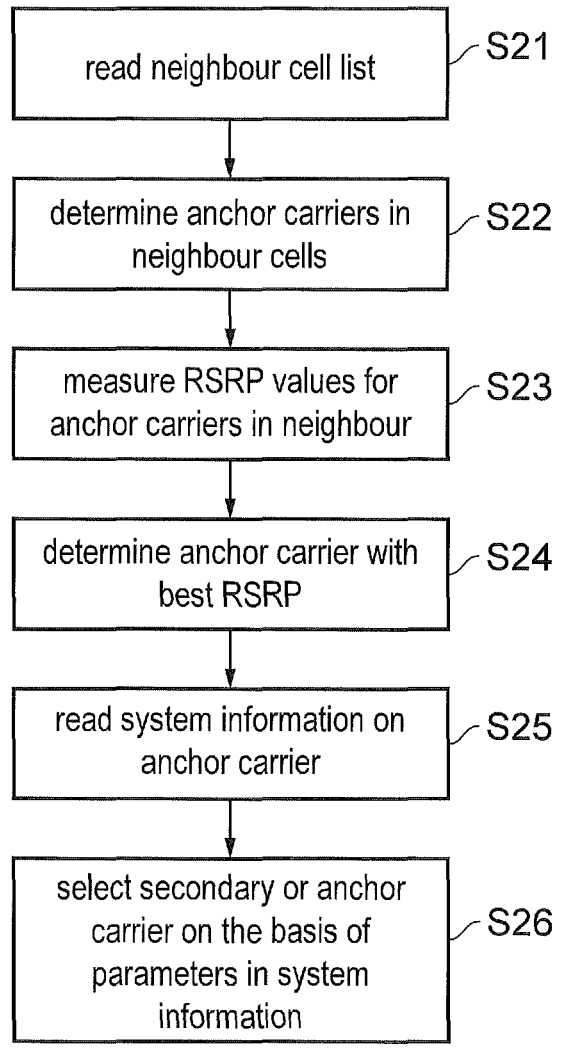
FIG. 10 is a flow diagram representing an example process in which a UE re-selects a cell when measurements are made on anchor carriers.

In some embodiments, the neighbour cell list may indicate only the anchor carriers of in-band carriers of the neighbour cells. The UE then performs measurements on those anchor carriers in order to derive RSRP measurements for the purposes of cell reselection. The UE may then select a secondary carrier that is associated to that anchor carrier by reading system information on the anchor carrier. The UE may not need to perform measurements on those secondary cells, since the signal quality on the secondary carrier is known to be the same as the signal quality on the anchor carrier, including any indicated measurement offset. This example embodiment is illustrated by the flow diagram in FIG. 10. The flow diagram shown in FIG. 10 is summarized as follows:

S21: The UE first reads the list of neighbouring cells providing a list of neighbouring narrowband carriers for which the UE can select as the carrier to receive downlink communications and camp on to.

S22: The UE then determines which of the narrowband carriers is an anchor carrier in the neighbouring cells.

S23: The UE then measures the received signal strength such as the RSRP of anchor carriers in each of the neighbouring cells.

S24: The UE then selects the anchor carrier of the neighbouring cells which provides the best RSRP value.

S25: After selecting the anchor carrier to use, the UE then reads the system information on the anchor carrier. This system information provides an indication of a location of secondary carriers on the cell in which the anchor carrier is present.

S26: The UE then selects either the secondary narrowband carrier or the anchor narrowband carrier on the basis of the parameters provided in the system information. For example, information can be provided which indicates the available resources on the secondary carrier, allowing the UE to choose a preferable secondary carrier.

Figure 11:
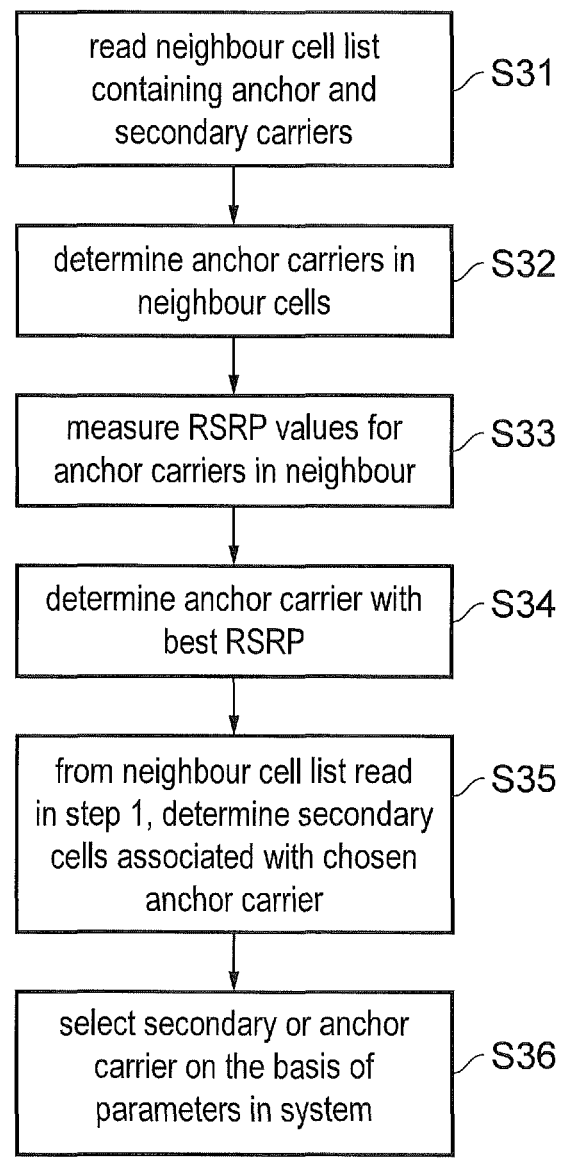
FIG. 11 is a flow diagram representing an example operation of a communications device when re-selecting a cell both providing either an anchor narrowband carrier or a secondary narrowband carrier which are provided in a list of available narrowband carriers within its vicinity.

In some embodiments, the neighbour cell list indicates which of the in-band carriers in neighbouring cells are anchor carriers and which are secondary carriers. The UE may then only perform measurements on the anchor carriers in the neighbour cells and select secondary carriers on the basis of anchor carrier measurements and other factors, such as load factors, access class barring factors etc. These other factors can be either known from the neighbouring cell list in the home cell or from system information read on the anchor carrier in the neighbour cell. A UE operating in accordance with this example embodiment is illustrated in FIG. 11. However, since part of the operation of the UE is the same as that described with reference to the flow diagram shown in FIG. 10, then only the differences between FIGS. 10 and 11 will be described. FIG. 11 is summarized as follows:

S31: The UE reads the neighboring cell list containing both the anchor narrowband carriers and the secondary narrowband carriers.

S32 to S34 correspond to S22 to S24 and so will not be described further.

S35: The UE then determines the secondary cells associated with the chosen anchor carrier from the list of neighbouring cells provided by the wireless communications network and read in S31.

S36: The UE then selects a secondary narrowband carrier or an anchor narrowband carrier on the basis of system parameters provided when reading the neighbouring cell list.

As will be appreciated from the above description, embodiments of the present technique can provide the following advantages:

The eNodeB is able to transmit an indication of its downlink transmit power in system information signalling. The UE can measure the downlink RSRP (measure of down-link signal quality) and derive a pathloss between itself and the eNodeB. This pathloss measurement can be used to select a cell that minimises uplink transmit power from the UE.

In a neighbour cell information list, the eNodeB is able to signal a CIO (Cell Individual Offset) offset on an individual cell. The UE incorporates the CIO when deciding on a cell on which to select or reselect. Typically, a UE would reselect to another cell if the other cell signal quality is higher than that of its serving cell by a predefined threshold. The CIO is a bias in favour of a particular cell, for example, if the predefined threshold=0 dB and CIO of a particular neighbour cell is 3 dB, the UE would reselect this neighbour cell is its RSRP is 3 dB worse than that of its serving cell.

Indication of Idle Mode Measured Results

Embodiments of the present technique can also provide a communications device, for example one which is configured for narrowband communications, such as may be suitable for example to support NB-IoT type communications. The communications device is configured to transmit signals to and/or receive signals from an infrastructure equipment of a mobile communications network via a wireless access interface. The communications device is configured to receive from the mobile communications network an indication for identifying one or more of narrowband cells, listed by the mobile communications network, for which the communications device should report to the mobile communications network, to receive a threshold of a measured received signal strength or quality value for reporting the cell, and to transmit an indication of the cell(s) exceeding the threshold for a predetermined number of the best measured received signal strength values of the one or more narrowband cells identified for reporting to the mobile communications network. As a result, the mobile communications network can redirect the communications device to one of the other narrowband cells other than the narrowband cell selected by the communications device, for example in order to improve load balancing in respect of a number of communications devices communicating via each of the narrowband cells to reduce congestion, to determine suitable cells for configuring the communications device with, for optimisation of the network deployment, for aid in determining UE position.

It has recently been proposed within 3GPP to provide an arrangement for inter-frequency load distribution. This can be achieved according to two methods. The first, which has been proposed is to use absolute priorities. This technique is currently used in LTE since Release 8 in which the operator may allocate a priority to each carrier and the UE should reselect the carrier according to that priority. The drawback of such a method is that the UE will preferentially select a cell on a carrier even if sometimes it does not have the best radio link quality amongst all cells, so this may consume more battery power due to higher amount of coverage enhancement/repetition required towards that priority cell. Furthermore, it is slightly more complicated than a simple approach of ranking radio measurements which is done in UMTS or intra-frequency LTE, whereby the UE selects the cell with the best measurement regardless of priority. However pure ranking as proposed in [5] does not allow prioritisation or load balancing.

In a second method, which was proposed in [6] and [7], the UE uses ranking to select the best cell in idle mode, but uses redirection to perform load balancing. Redirection uses an explicit dedicated command to the UE either in RRC Connection release, or in RRC Connection Setup or RRC Connection Reconfiguration in order that the UE selects the indicated cell or carrier In order to achieve successful redirection, it is beneficial for the UE to provide measurement indications to the network. However in order to provide measurements the uplink message size is increased and so causes additional power consumption especially for small data whereby the measurement reporting is a significant amount of information, relative to the amount of data transmitted. Particularly for the case of indicating measurements during connection establishment, this causes significant overhead on RACH resources in order for the network to set up a connection on another frequency.

In UMTS, a method was introduced based on [3]. With this method, the network broadcasts a list of LTE carriers and RSRP thresholds for reporting. The UE sends a one bit indication for each carrier meeting the criteria. In UMTS the configuration is limited to two LTE carriers, and the previously proposed arrangement only allows for the UE to report on the specific listed carriers and does not allow for prioritizing the results based on the best measured cells or carriers.

Figure 12:
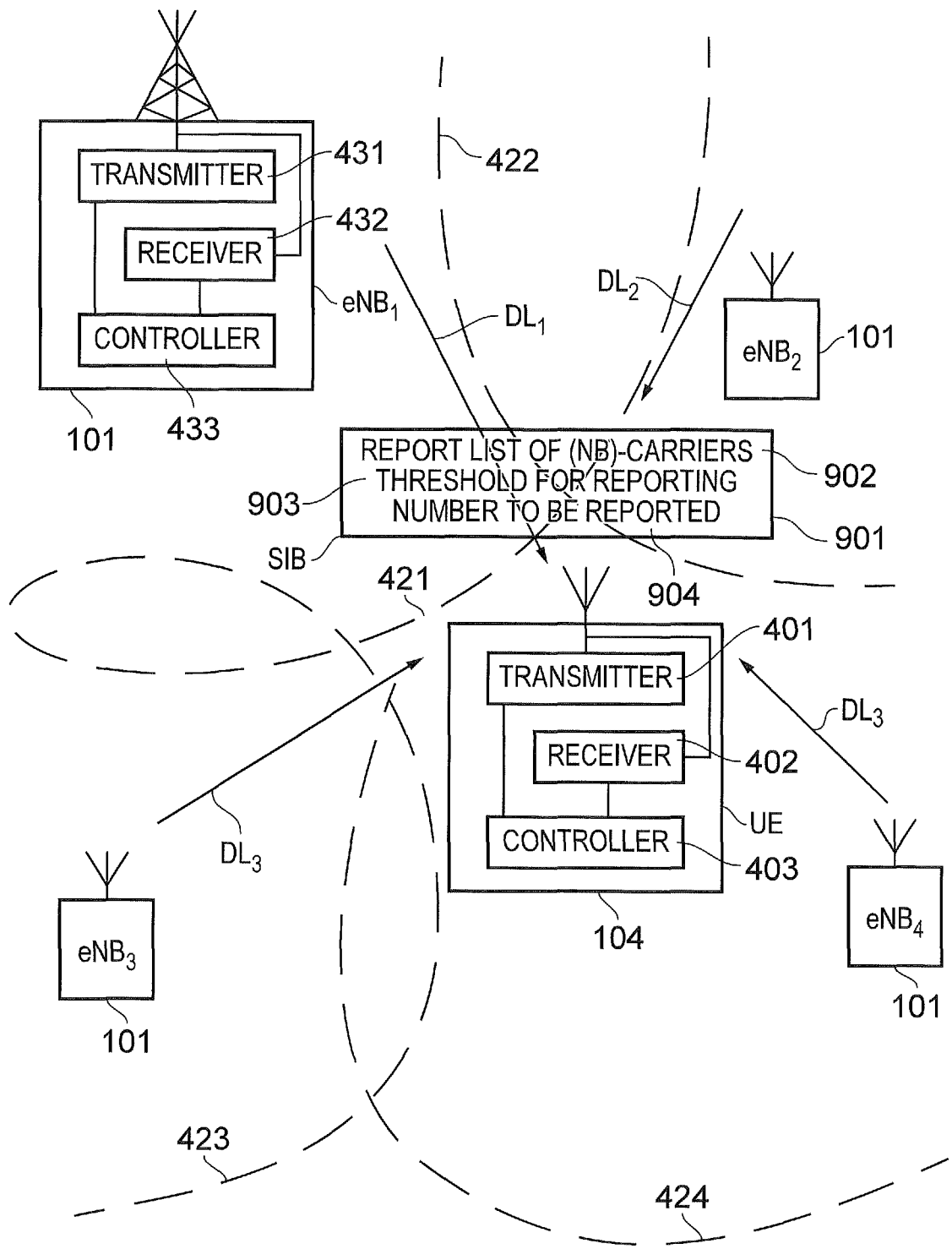
FIG. 12 is a schematic illustration and part block diagram corresponding to the examples shown in FIGS. 4 and 8, showing an arrangement in which a UE is directed to report received signal strength values for neighbouring cells according to the present technique.

An example process performed by a UE 104 and an eNB 401 to provide measurement reporting of identified cells according to an example embodiment of the present technique is shown in FIG. 12. FIG. 12 corresponds to the diagram shown in FIGS. 4 and 8 and so only differences between FIGS. 4 and 8 will now be described. As shown in FIG. 12, the eNB 101 transmits on a downlink to the UE 104 an indication 901 identifying a list of cells 902 for which the UE should report that a predetermined criteria has been met. Also included within this information is a threshold value 903 indicating a value below which the UE does not need to report that cells. Furthermore, optionally the eNB 101 transmits an indication of a number of cells 904 which are to be reported. As will be appreciated the received signal strength may for example be the RSRP value. Furthermore, in accordance with other embodiments, the cells could be on narrowband carriers. In one example, the indication 901 of this information 902, 903, 904 is provided as part of the system information transmitted by the eNB. In other examples the indication of the list of cells for which received signal strengths are to be reported and the threshold for reporting may be transmitted separately. In other embodiments the number of cells for which measurements are to be reported may be predetermined and preprogrammed into the UE.

Figure 13:
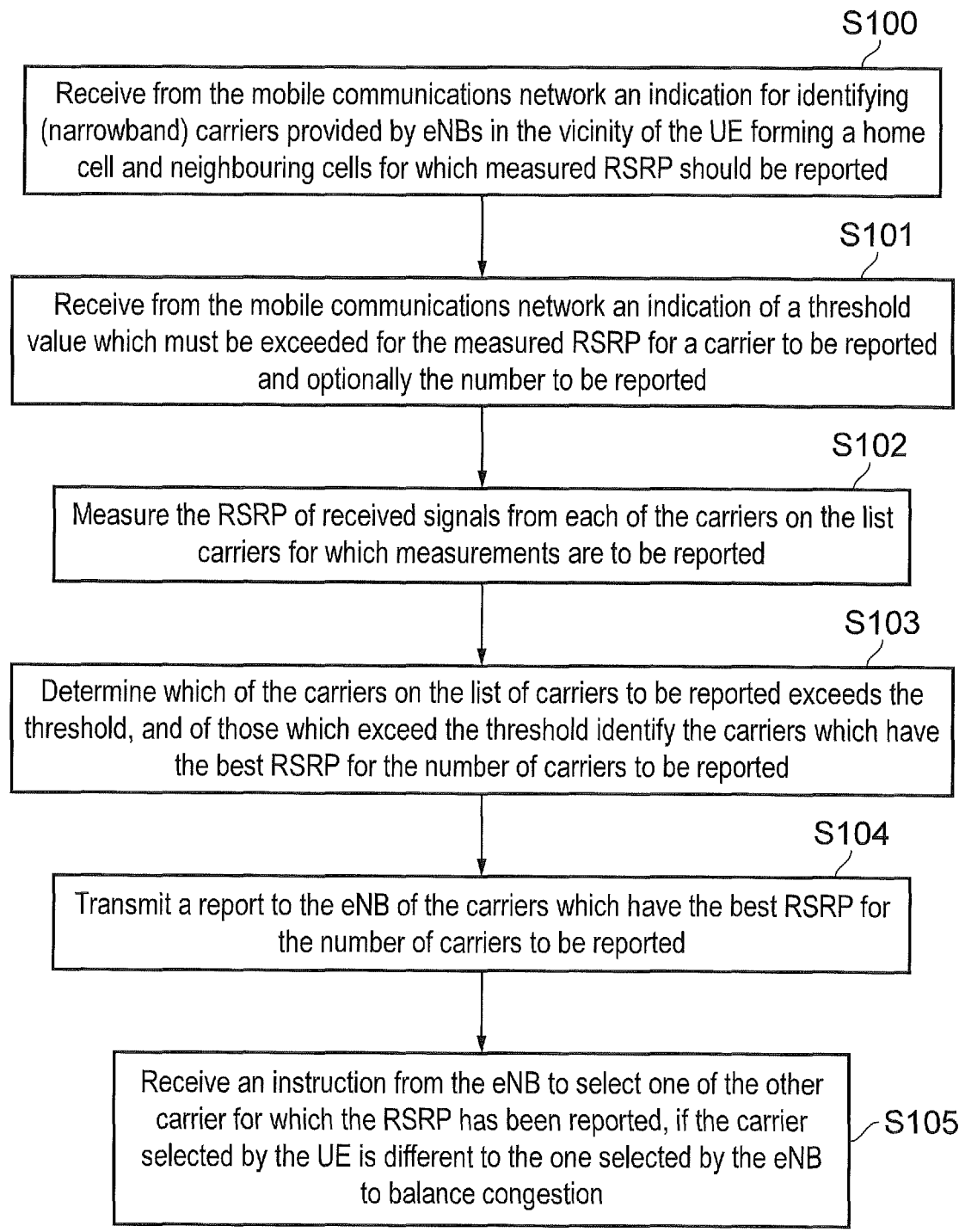
FIG. 13 is a flow diagram representing an example process in which a UE is directed to report measured signal strength values for the mobile communications network to perform redirection according to an example embodiment of the present technique.

According to an example illustration of the operation of a UE in accordance with the present technique, a flow diagram in FIG. 13 provides a sequence of steps performed by the UE which are summarized as follows:
S100: The UE receives from the mobile communications network, for example from the eNB to which it is currently attached, an indication for identifying carriers provided by eNB's within the vicinity of the UE which may form a home cell and neighbouring cells for which a measured signal strength RSRP should be reported.
S101: The UE also receives from the mobile communications network an indication of a threshold value which must be exceeded for the measured RSRP value for a carrier to be reported to the mobile communications network. Optionally this threshold value may be predetermined within the UE. Furthermore, the UE may optionally receive the number of carriers for which the RSRP value is to be reported. Alternatively this could be pre-programmed within the UE.
S102: The UE then proceeds to measure the received signal strength value RSRP for signals received from each of the carriers on the list of carriers for which measurements are to be reported.
S103: The UE then compares the RSRP values for each of the carriers on the lists of carriers to be reported with the threshold value and ignores those carriers for which the RSRP value is below the threshold. That is to say, the UE only considers reporting RSRP values from carriers which exceeds the threshold. Of the carriers which exceed the threshold, the UE then identifies the best of the carriers up to the number of carriers which is to be reported.
S104: The UE then transmits a report to the eNB of the carriers which have the best RSRP values which exceed the threshold and only for the number of carriers which is to be reported.
S105: The eNB having reviewed the measurement reports for the carriers on the list and being aware that the UE has attached to one of the selected carriers may then redirect the UE to select another of the carriers based on the reported measurements. The redirection may be required in order to perform load balancing to reduce congestion on the number of cells available for example to avoid all of the UEs in the vicinity selecting the best cell.

In the above example, the UE reports RSRP measurements on cells passing a criteria. In other examples, the UE may report other measurements, such as RSRQ, RSSI, or may simply report those cells which meet a criterion (an example criterion being that the RSRP is greater than a threshold).

According to one example embodiment, the UE reports only the best carriers or cells meeting the criteria. For example, the reporting can be performed by:
 a. Only setting the bits in a bitmap corresponding to the best N carriers or cells indexing the order in which they are broadcast.
 b. Explicit indication of carrier or cell, for example reporting of the physical cell identity, but the list is limited to the best N (and reporting in the order of best to worst)

The first method of reporting (method (a) in the above list) allows for indication of a larger list for measurement, while limiting the reporting to a small subset from within the cells or carriers meeting the criteria. The indication of cells or carriers meeting the criteria may also include an indication of the value of measured result (for example RSRP, RSRQ, RSSI or more generally the measured signal strength or quality)

According to a second example embodiment:

1. Additionally or alternatively, the network may provide a list of prioritized carriers for reselection, and another list of carriers for measurements.
2. UE performs reselection according to the prioritized list for reselection (i.e. prioritises camping on that list, over the list for measurement)
3. UE can report the best carriers from each list—e.g. second best of the prioritised list for reselection and the best from the non-prioritised list.

The second embodiment provides an arrangement for the UE to specify a simplified idle mode prioritization, while allowing measurements on a larger list of cells for reporting, and still limiting report size.

The following numbered paragraphs provide further example aspects and features of the present technique:

Paragraph 1. A communications device configured to transmit signals to and/or receive signals from an infrastructure equipment of a mobile communications network, the communications device comprising a receiver configured to receive signals transmitted by the infrastructure equipment, a transmitter configured to transmit signals to the infrastructure equipment, and a controller configured to control the transmitter and the receiver to receive data from the infrastructure equipment, wherein the mobile communications network forms a wireless access interface, and the transmitter and the receiver are configured to transmit and receive signals via the wireless access interface using predetermined narrow band carriers of different types provided by one or more cells, and the controller is configured in a combination with the transmitter and the receiver to receive from the mobile communications network an indication listing narrowband carriers provided by one or more infrastructure equipment forming one or more cells of the mobile communications network, and an indication of the type of the narrowband carriers, to generate a metric representing a strength or quality of signals received from one or more cells on each of the narrowband carriers, and to select one of the cells on one of the narrowband carriers from the list of the narrowband carriers based on the type of the narrowband carrier and a value of the generated received signal metric for the signals received from the narrowband carriers, the cell on the selected narrowband carrier being used by the communications device for receiving data from the mobile communications network via the selected narrowband carrier.

Paragraph 2. A communications device according to paragraph 1, wherein the controller is configured in combination with the receiver and the transmitter to receive from the mobile communications network an indication of an offset value for adjusting the received signal metric dependent on the type of the narrowband carrier, to combine the offset value with the received signal metric measured for each of the cells on the narrow band carriers of the type for which the offset should be applied, to form for each cell an adjusted received signal metric, and to select one of the cells on the narrowband carriers from the list of cells with the largest received signal metric or adjusted received signal metric, to bias the selection of the narrowband carrier to be of one of the types of the narrowband carriers depending on the value of the offset.

Paragraph 3. A communications device according to paragraph 2, wherein communications device is powered by a battery and the controller is configured in combination with the receiver and the transmitter to determine a relative power level of the battery, and if the battery power level is above a predetermined threshold, not to combine the offset value with the measured received signal strength for the narrowband carrier of the corresponding type.

Paragraph 4. A communications device according to paragraph 1, wherein the communications device is provided with a threshold value of received signal metric for each of the different types of the narrowband carriers, and controller is configured to select one of the narrowband carriers by comparing each of the received signal metric for each of the narrowband carriers of each type on the list of the narrowband carriers with the threshold for the type of the narrowband carrier, the selecting the narrowband carrier from the list of narrowband carriers includes selecting from the narrowband carriers on the list which exceed the threshold for the type of narrowband carrier.

Paragraph 5. A communications device according to paragraph 1, wherein the communications device is provided with a maximum synchronisation time for each of the different types of the narrowband carriers, and controller is configured after selecting one of the narrowband carriers, to start a timer, to search for a synchronisation signal transmitted on the selected narrowband carrier, and, if the timer indicates that the maximum synchronisation time has been exceed without detecting the synchronisation signal, to select one of the other narrowband carriers.

Paragraph 6. A communications device according to any of paragraphs 1 to 5, wherein the narrowband carriers of each type are grouped in a list provided with the indication from the mobile communications network, and the controller is configured in combination with the receiver to receive with the indication of the narrowband carriers according to the type a pointer, which points to narrowband carriers of the same type on the list of narrowband carriers.

Paragraph 7. A communications device according to any of paragraphs 1 to 5, wherein the indication of the narrowband carriers received from the mobile communications network includes an indication of whether the narrowband carrier of each type is provided by an infrastructure equipment forming a small cell, the small cell being formed by the infrastructure equipment by using a reduced downlink transmission power compared with infrastructure equipment forming larger cells, and the controller is configured in combination with the receiver to select a narrowband carrier provided by a small cell in preference to a narrowband carrier provided by an infrastructure equipment not forming a small cell for the same type and the same measured received signal strength.

Paragraph 8. A communications device according to any of paragraphs 1 to 7, wherein the types of narrowband carrier include an in-band narrowband carrier which is provided by an infrastructure equipment within a system bandwidth of the mobile communications network, a stand alone narrowband carrier which is provided outside the system bandwidth and a guardband narrowband carrier which is provided within a guard frequency band of the system bandwidth, and the controller is configured to process the received signal metrics for each of the narrowband carriers listed from the mobile communications network to select in-band narrowband carrier types or guardband narrowband carrier types in preference to standalone narrowband carrier types.

Paragraph 9. A communications device according to paragraph 8, wherein one or both of the in band narrowband carriers and the standalone narrowband carriers include an anchor type which includes control channels providing control information common for all communications devices transmitting signals to or receiving signals from the infrastructure equipment providing the narrowband carriers and a secondary narrowband carrier providing communications resources for the communications device to transmit signals to or receive signals from the infrastructure equipment.

Paragraph 10. A communications device according to paragraph 9, wherein the controller is configured in combination with the receiver
to generate the received signal metrics for the anchor carrier, but not the secondary carrier, and selecting the secondary carrier based on the measured received signal strength for the anchor carrier in the same cell.

Paragraph 11. A communications device according to paragraph 10, wherein each of the one or more secondary carriers is identified as an offset from the anchor carrier indicated by information received from the mobile communications network.

Paragraph 12. A communications device according to paragraph 10, wherein each of the one or more secondary carriers is identified from the control information received from the anchor carrier operating on the same cell.

Paragraph 13. A communications device configured to transmit signals to and/or receive signals from an infrastructure equipment of a mobile communications network, the communications device comprising
a receiver configured to receive signals transmitted by the infrastructure equipment,
a transmitter configured to transmit signals to the infrastructure equipment, and
a controller configured to control the transmitter and the receiver to receive data from the infrastructure equipment, wherein the mobile communications network forms a wireless access interface, and the controller is configured in a combination with the transmitter and the receiver
to receive from the mobile communications network an indication for identifying one or more of the narrowband cells, listed by the mobile communications network, for which the communications device should perform measurements for evaluating a received signal metric based on a quality or a signal strength of the received signals,
to receive one or more predetermined reporting criteria for determining whether to report that one or more of the narrowband cells listed satisfies the one or more predetermined reporting criteria based on the evaluated received signal metric up to a predetermined number, and
to transmit an indication of the one or more cells with the best of the evaluated predetermined reporting criteria, up to the predetermined number to the mobile communications network so that the mobile communications network can redirect the communications device to one of the other narrowband cells other than the narrowband cell selected by the communications device.

Paragraph 14. A communications device according to paragraph 13, wherein the indication for identifying the one or more narrowband cells for reporting the evaluated received signal metric comprises a reporting list of the narrowband cells and the reporting criteria comprises a threshold value for which the received signal metric must be exceeded, and the controller is configured in combination with the receiver and the transmitter
to apply the threshold to the received signal metric for each of the narrowband cells identified in the reporting list, and
if the received signal metric for the narrowband cell exceeds the threshold, to transmit an indication of the narrowband cell to the mobile communications network.

Paragraph 15. A communications device according to paragraph 14, wherein the list received from the mobile communications network includes a higher priority list of cells for selection by the communications device and a lower priority list of cells for which the predetermined reporting criteria should be evaluated, and the controller is configured in combination with the receiver and the transmitter
to the received signal metric by measuring the signal strength or quality of the signals received from the cells of the higher priority list and the lower priority list according to the predetermined reporting criteria,
to select one of the narrowband cells from the higher priority list of the cells based on the evaluated predetermined reporting criteria of the signals received from the narrowband cells, and
to transmit the indication of the predetermined number of the one or more cells with the best of the evaluated predetermined reporting criteria to the mobile communications network cells for at least one of the higher priority list and the lower priority list.

Paragraph 16. A communications device according to paragraph 15, wherein the controller is configured
to determine whether one of the narrowband cells from the higher priority list can be selected by satisfying the evaluated predetermined reporting criteria, and if not
to determine whether the one of the narrowband cells from the lower priority list.

Paragraph 17. A communications device according to any of paragraphs 13 to 16, wherein the controller is configured in combination with the receiver to receive an indication from the mobile communications network redirecting the communications device to a different narrowband cell which has been selected by the infrastructure equipment Annex 1:
The simplified structure of the downlink of an LTE wireless access interface presented in FIG. 2, also includes an illustration of each subframe 201, which comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel PDCCH, a physical control format indicator channel PCFICH and a physical HARQ indicator channel PHICH. The data region may contain a number of physical channel for the transmission of data, such as a physical downlink shared channel PDSCH and a physical broadcast channels PBCH. Although these physical channels provide a wide range of functionality to LTE systems, in terms of resource allocation and the present disclosure PDCCH and PDSCH are most relevant. Further information on the structure and functioning of the physical channels of LTE systems can be found in [1].

Resources within the PDSCH may be allocated by an eNodeB to UEs being served by the eNodeB. For example, a number of resource blocks of the PDSCH may be allocated to a UE in order that it may receive data that it has previously requested or data which is being pushed to it by the eNodeB, such as radio resource control RRC signalling. In FIG. 2, UE1 has been allocated resources 208 of the data region 206, UE2 resources 209 and UE resources 210. UEs in a an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resources, resource control information specifying downlink resource allocations is conveyed across the PDCCH in a form termed downlink control information DCI, where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH. Each uplink subframe may include a plurality of different channels, for example a physical uplink shared channel PUSCH 305, a physical uplink control channel PUCCH 306, and a physical random access channel PRACH. The physical Uplink Control Channel PUCCH may carry control information such as ACK/NACK to the eNodeB for downlink transmissions, scheduling request indicators SRI for UEs wishing to be scheduled uplink resources, and feedback of downlink channel state information CSI for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals DMRS 307 and sounding reference signals SRS 308 may be present in an uplink subframe where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNode B. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information UCI on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signaling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating eNodeB, thus forming a conventional cellular telecommunications system. Although cellular communications system such as those based on the previously released LTE standards have been commercially successful, a number of disadvantages are associated with such centralized systems. For example, if two UEs which are in close proximity wish to communicate with each other, uplink and downlink resources sufficient to convey the data are required. Consequently, two portions of the system's resources are being used to convey a single portion of data. A second disadvantage is that an eNodeB is required if UEs, even when in close proximity, wish to communicate with one another. These limitations may be problematic when the system is experiencing high load or eNodeB coverage is not available, for instance in remote areas or when eNodeBs are not functioning correctly. Overcoming these limitations may increase both the capacity and efficiency of LTE networks but also lead to the creations of new revenue possibilities for LTE network operators.

REFERENCES

[1] LTE for UMTS: OFDMA and SC-FDMA Based Radio Access, Harris Holma and Antti Toskala, Wiley 2009, ISBN 978-0-470-99401-6.

[2] RP-151109, "New SI proposal: Feasibility Study on LTE-based V2X Services," LG Electronics, CATT, Vodafone, Huawei

[3] U.S. Pat. No. 8,837,321 "Measurement reporting", Henttonen et al

[4] 3GPP TS 25.331 UMTS RRC specification

[5] R2-156172 "NB-IoT-Idle mode mobility", Ericsson

[6] R2-156394 "RRC Connection Control for NB-IoT", Ericsson

[7] R2-156762, "Idle Mode Mobility", Huawei

What is claimed is:

1. A communications device configured to transmit signals to and/or receive signals from an infrastructure equipment of a mobile communications network, the communications device comprising
a receiver configured to receive signals transmitted by the infrastructure equipment,
a transmitter configured to transmit signals to the infrastructure equipment, and
a controller configured to control the transmitter and the receiver to receive data from the infrastructure equipment, wherein the mobile communications network forms a wireless access interface, and the transmitter and the receiver are configured to transmit and receive signals via the wireless access interface using predetermined narrow band carriers of different types provided by one or more cells, and the controller is configured in a combination with the transmitter and the receiver
to receive from the mobile communications network an indication listing narrowband carriers provided by one or more infrastructure equipment forming one or more cells of the mobile communications network, and an indication of the type of the narrowband carriers,
to generate a metric representing a strength or quality of signals received from one or more cells on each of the narrowband carriers, and
to select one of the cells on one of the narrowband carriers from the list of the narrowband carriers based on the type of the narrowband carrier and a value of the generated received signal metric for the signals received from the narrowband carriers, the cell on the selected narrowband carrier being used by the communications device for receiving data from the mobile communications network via the selected narrowband carrier.

2. The communications device as claimed in claim 1, wherein the controller is configured in combination with the receiver and the transmitter to receive from the mobile communications network an indication of an offset value for adjusting the received signal metric dependent on the type of the narrowband carrier, to combine the offset value with the received signal metric measured for each of the cells on the narrow band carriers of the type for which the offset should be applied, to form for each cell an adjusted received signal metric, and to select one of the cells on the narrowband carriers from the list of cells with the largest received signal metric or adjusted received signal metric, to bias the selection of the narrowband carrier to be of one of the types of the narrowband carriers depending on the value of the offset.

3. The communications device as claimed in claim 2, wherein communications device is powered by a battery and the controller is configured in combination with the receiver and the transmitter to determine a relative power level of the battery, and if the battery power level is above a predetermined threshold, not to combine the offset value with the measured received signal strength for the narrowband carrier of the corresponding type.

4. The communications device as claimed in claim 1, wherein the communications device is provided with a threshold value of received signal metric for each of the different types of the narrowband carriers, and controller is configured to select one of the narrowband carriers by comparing each of the received signal metric for each of the narrowband carriers of each type on the list of the narrowband carriers with the threshold for the type of the narrowband carrier, the selecting the narrowband carrier from the list of narrowband carriers includes selecting from the narrowband carriers on the list which exceed the threshold for the type of narrowband carrier.

5. The communications device as claimed in claim 1, wherein the communications device is provided with a maximum synchronisation time for each of the different types of the narrowband carriers, and controller is configured after selecting one of the narrowband carriers, to start a timer, to search for a synchronisation signal transmitted on the selected narrowband carrier, and, if the timer indicates that the maximum synchronisation time has been exceed without detecting the synchronisation signal, to select one of the other narrowband carriers.

6. The communications device as claimed in claim 1, wherein the narrowband carriers of each type are grouped in a list provided with the indication from the mobile communications network, and the controller is configured in combination with the receiver to receive with the indication of the narrowband carriers according to the type a pointer, which points to narrowband carriers of the same type on the list of narrowband carriers.

7. The communications device as claimed in claim 1, wherein the indication of the narrowband carriers received from the mobile communications network includes an indication of whether the narrowband carrier of each type is provided by an infrastructure equipment forming a small cell, the small cell being formed by the infrastructure equipment by using a reduced downlink transmission power compared with infrastructure equipment forming larger cells, and the controller is configured in combination with the receiver to select a narrowband carrier provided by a small cell in preference to a narrowband carrier provided by an infrastructure equipment not forming a small cell for the same type and the same measured received signal strength.

8. The communications device as claimed in claim 1, wherein the types of narrowband carrier include an in-band narrowband carrier which is provided by an infrastructure equipment within a system bandwidth of the mobile communications network, a stand alone narrowband carrier which is provided outside the system bandwidth and a guardband narrowband carrier which is provided within a guard frequency band of the system bandwidth, and the controller is configured to process the received signal metrics for each of the narrowband carriers listed from the mobile communications network to select in-band narrowband carrier types or guardband narrowband carrier types in preference to standalone narrowband carrier types.

9. The communications device as claimed in claim 8, wherein one or both of the in band narrowband carriers and the standalone narrowband carriers include an anchor type which includes control channels providing control information common for all communications devices transmitting signals to or receiving signals from the infrastructure equipment providing the narrowband carriers and a secondary narrowband carrier providing communications resources for the communications device to transmit signals to or receive signals from the infrastructure equipment.

10. The communications device as claimed in claim 9 wherein the controller is configured in combination with the receiver to generate the received signal metrics for the anchor carrier, but not the secondary carrier, and selecting the secondary carrier based on the measured received signal strength for the anchor carrier in the same cell.

11. The communications device as claimed in claim 10, wherein each of the one or more secondary carriers is identified as an offset from the anchor carrier indicated by information received from the mobile communications network.

12. The communications device as claimed in claim 10, wherein each of the one or more secondary carriers is identified from the control information received from the anchor carrier operating on the same cell.

13. A method of selecting a narrowband carrier provided by an infrastructure equipment of a mobile communications network for receiving downlink signals from the mobile communications network, the method comprising
  receiving from the mobile communications network an indication listing narrowband carriers provided by one or more infrastructure equipment forming one or more cells of the mobile communications network, the narrowband carriers being a plurality of different types,
  receiving an indication listing the narrowband carriers provided by the infrastructure equipment the type of each of the listed narrowband carriers,
  generating a metric representing a strength or quality of signals received from one or more of the cells on each of the narrowband carriers,
  selecting one of the cells on one of the narrowband carriers from the list of the narrowband carriers based on the type of the narrowband carrier and a value of the generated received signal metric for the signals received from the narrowband carriers, for receiving data from the mobile communications network via the selected narrowband carrier.

14. A The method as claimed in claim 13, the method comprising receiving from the mobile communications network an indication of an offset value for adjusting the received signal metric dependent on the type of the narrowband carrier, combining the offset value with the received signal metric measured for each of the cells of the narrow band carriers of the type for which the offset should be applied, to form for each cell an adjusted received signal metric, wherein the selecting one of the cells from the list includes selecting one of the cells on the narrowband carriers from the list of cells with the largest received signal metric or adjusted received signal metric, to bias the selection of the narrowband carrier to be of one of the types of the narrowband carriers depending on the value of the offset.

15. An infrastructure equipment forming part of a mobile communications network for transmitting signals to or receiving signals from communications devices, the infrastructure equipment comprising
  a transmitter configured to transmit signals to one or more of the communications devices in accordance with a wireless access interface formed by the infrastructure equipment,
  a receiver configured to receive signals transmitted by one or more of the communications devices in accordance with the wireless access interface, and
  a controller configured to control the transmitter and the receiver to transmit data to one or more of the communications devices or receive data from the one or more communications devices via the wireless access interface, wherein the controller is configured with the transmitter and the receiver
  to form one or more narrowband cells, each of the narrowband cells being formed from a a plurality of different types of narrowband carriers including an inband type formed within a system bandwidth of the mobile communications network or a standalone type formed outside the system bandwidth,
  to transmit to one or more of the communications devices an indication listing the narrowband carriers provided by the infrastructure equipment and one or more other infrastructure equipment forming one or more cells of the mobile communications network, and an indication of the type of the narrowband carriers, wherein the communications devices can select one of the cells on one of the narrowband carriers depending on the type and a strength of signals received from the narrowband carriers listed.

\* \* \* \* \*